(12) United States Patent
Ohno et al.

(10) Patent No.: US 8,283,019 B2
(45) Date of Patent: Oct. 9, 2012

(54) HONEYCOMB STRUCTURED BODY

(75) Inventors: Kazushige Ohno, Ibigawacho (JP); Kazutake Ogyu, Ibigawacho (JP); Takafumi Kasuga, Ibigawacho (JP)

(73) Assignee: Ibiden Co., Ltd., Ogaki-shi (JP)

( * ) Notice: Subject to any disclaimer, the term of this patent is extended or adjusted under 35 U.S.C. 154(b) by 1210 days.

(21) Appl. No.: 11/563,512

(22) Filed: Nov. 27, 2006

(65) Prior Publication Data

US 2007/0148402 A1    Jun. 28, 2007

Related U.S. Application Data

(63) Continuation of application No. PCT/JP2006/006571, filed on Mar. 29, 2006.

(30) Foreign Application Priority Data

Mar. 31, 2005 (JP) .................................. 2005-104317

(51) Int. Cl.
B32B 3/12 (2006.01)

(52) U.S. Cl. .......................... 428/116; 428/117; 428/118

(58) Field of Classification Search ........................ None
See application file for complete search history.

(56) References Cited

U.S. PATENT DOCUMENTS

| | | | |
|---|---|---|---|
| 4,329,162 A | 5/1982 | Pitcher, Jr. | |
| 4,420,316 A | 12/1983 | Frost et al. | |
| 5,106,802 A * | 4/1992 | Horiuchi et al. | 502/65 |
| 5,992,504 A | 11/1999 | Kumazawa et al. | |
| 6,206,944 B1 * | 3/2001 | Hickman | 55/523 |
| 2005/0153099 A1 | 7/2005 | Yamada | |
| 2005/0266991 A1 | 12/2005 | Ohno et al. | |
| 2006/0019061 A1 * | 1/2006 | Oshimi | 428/116 |
| 2006/0075731 A1 * | 4/2006 | Ohno et al. | 55/523 |
| 2007/0289275 A1 | 12/2007 | Ohno et al. | |
| 2008/0083201 A1 | 4/2008 | Oya et al. | |
| 2008/0176013 A1 | 7/2008 | Ohno et al. | |
| 2008/0276586 A1 | 11/2008 | Oya et al. | |
| 2008/0289307 A1 | 11/2008 | Ogyu et al. | |
| 2008/0295470 A1 | 12/2008 | Ogyu et al. | |

FOREIGN PATENT DOCUMENTS

| | | |
|---|---|---|
| EP | 1489274 | 12/2004 |
| EP | 1666120 | 6/2006 |
| EP | 1676620 | 7/2006 |

(Continued)

OTHER PUBLICATIONS

U.S. Appl. No. 10/514,560, filed Dec. 1, 2005, Ohno et al.

(Continued)

*Primary Examiner* — Jennifer McNeil
*Assistant Examiner* — Clarisa M Carrizales
(74) *Attorney, Agent, or Firm* — Ditthavong Mori & Steiner, P.C.

(57) ABSTRACT

A honeycomb structured body including a plurality of cells that are placed in parallel with one another in a longitudinal direction with a cell wall therebetween, and a sealing portion sealing either one of the end portions of the cells. The honeycomb structured body has a porosity of at least about 70% and at most about 95% and having a length about 0.2 to about 0.9 times a diameter thereof, where the length is in the longitudinal direction of the honeycomb structured body, and the diameter is of a cross-section perpendicular to the longitudinal direction of the honeycomb structured body.

21 Claims, 11 Drawing Sheets

| | FOREIGN PATENT DOCUMENTS | |
|---|---|---|
| EP | 1676621 | 7/2006 |
| JP | 8-61874 | 3/1996 |
| JP | 10-328516 | 12/1998 |
| JP | 2003-515023 | 4/2003 |
| JP | 2004-321957 | 11/2004 |
| WO | WO 03/093658 A1 | 11/2003 |
| WO | WO 2005/000445 | 1/2005 |
| WO | WO 2005/025720 | 3/2005 |
| WO | WO 2005/037406 | 4/2005 |

OTHER PUBLICATIONS

U.S. Appl. No. 10/518,373, filed Apr. 13, 2006, Ohno et al.
U.S. Appl. No. 11/368,401, filed Sep. 28, 2006, Yoshida.
International Preliminary Report on Patentability, PCT/JP2006/306571, mailed Oct. 3, 2007.

* cited by examiner

A-A line cross-sectional view

B-B line cross-sectional view

C-C line cross-sectional view

HONEYCOMB STRUCTURED BODY

CROSS-REFERENCE TO RELATED APPLICATIONS

This application is a continuation application of PCT/JP2006/306571 filed on Mar. 29, 2006, which claims priority of Japanese Patent Application No. 2005-104317 filed on Mar. 31, 2005. The contents of these applications are incorporated herein by reference in their entirety.

BACKGROUND OF THE INVENTION

1. Field of the Invention

The present invention relates to a honeycomb structured body.

2. Discussion of the Background

In recent years, particulates, such as soot, contained in exhaust gases discharged from internal combustion engines of vehicles such as buses and trucks, and construction machines, have raised serious problems, as those particulates are harmful to the environment and the human body.

For this reason, there have been proposed various filters using a honeycomb structured body as a ceramic filters which are porous ceramics made of cordierite, SiC and the like and made to pass through exhaust gases to capture particulates in exhaust gases so as to purify the exhaust gases, have been proposed.

Normally, in such a ceramic filter, a cell wall, that separates a plurality of cells placed in parallel in the same direction and forming a pillar-shaped body, from one another, is allowed to function as a filter.

Namely, in the above-mentioned honeycomb filter, either of the exhaust gas-inlet side or the exhaust gas-outlet side of the end portions of the cells, which are formed into the above-mentioned pillar-shaped body, is sealed with a plug in so-called a checkered pattern. Thus, exhaust gases that flow into one cell are allowed to always pass through the cell wall which separates the cells from one another and flow out from another cell, and when exhaust gases pass through these cell walls, particulates are captured at the cell wall portion to purify exhaust gases.

As this exhaust gas purifying function is exerted, particulates gradually deposit on the portion of cell walls which separate cells of the honeycomb filter, and clogging occurs to block ventilation. Therefore, the honeycomb filter needs to be periodically subjected to a regenerating process, in which particulates that cause clogging are burned to be removed, in order to regenerate the honeycomb filter.

Accordingly, the honeycomb filter is required, as its characteristics in addition to high capture efficiency and low pressure loss, to be free from occurrence of cracks or erosion in the regenerating processes, and further, to be free from heat deterioration of a catalyst, if a catalyst is supported thereon.

With respect to a honeycomb filter which is low in pressure loss and free from occurrence of cracks and erosion loss in regenerating processes, there is proposed a ceramic filter having a honeycomb bulk density of at least about 0.50 g/cm$^3$ and an effective aspect ratio of the length to the diameter of not more than about 0.9, and provided with a porous ceramic honeycomb structured body with closed end portions for capturing and burning diesel exhaust fine particles (JP-A 2003-515023).

Further, in JP-A 2003-515023, it is described that the porosity of the cell wall is normally about 50%, and when the porosity exceeds 70%, the integrity as a ceramic filter is questionable.

The contents of JP-A 2003-515023 are incorporated herein by reference in their entirety.

SUMMARY OF THE INVENTION

A honeycomb structured body of the present invention is a honeycomb structured body comprising:

a plurality of cells that are placed in parallel with one another in longitudinal direction with a cell wall therebetween; and a sealing portion sealing either one of the end portions of the cells, wherein the honeycomb structured body has a porosity of at least about 70% and at most about 95% and having a length about 0.2 to about 0.9 times a diameter thereof, the length being in the longitudinal direction of the honeycomb structured body, and the diameter being of a cross-section perpendicular to the longitudinal direction of the honeycomb structured body.

Hereinafter, in the present specification, the ratio of the length of the honeycomb structured body in the longitudinal direction to the diameter of the cross-section perpendicular to the longitudinal direction of the honeycomb structured body is also referred to as an aspect ratio.

Further, in the present invention, the diameter of the cross-section perpendicular to the longitudinal direction of the honeycomb structured body indicates the length of the longest part of the above-mentioned perpendicular cross-section, irrespective to the shape of the perpendicular cross-section. When the cross-section shape is a circular form, the diameter of the cross-section indicates the distance across the circle through the center.

The honeycomb structured body of the present invention desirably has an aperture ratio of at least about 30% and at most about 50%.

In the honeycomb structured body of the present invention, a thickness of the cell wall is desirably about 0.6 mm or more.

In the honeycomb structured body of the present invention, desirably, a catalyst is supported on at least a portion of the honeycomb structured body.

The honeycomb structured body of the present invention is a honeycomb structured body comprising:

a plurality of cells that are placed in parallel with one another in a longitudinal direction with a cell wall therebetween; and a sealing portion sealing either one of the end portions of the cells, wherein said honeycomb structured body has a plurality of lamination members laminated in the longitudinal direction so that the cells are superposed on one another, said lamination members mainly composed of inorganic fiber, and the honeycomb structured body has a porosity of at least about 70% and at most about 95% and having a length about 0.2 to about 0.9 times a diameter thereof, the length being in the longitudinal direction of the honeycomb structured body, and the diameter being of a cross-section perpendicular to the longitudinal direction of the honeycomb structured body.

In the honeycomb structured body of the present invention, a plate member made of metal that is desirably laminated as a lamination member for the end portion on both ends of the laminated lamination members mainly composed of inorganic fiber.

In the honeycomb structured body of the present invention, a thickness of the lamination member is desirably at least about 0.1 mm and at most about 20 mm.

In the honeycomb structured body of the present invention, the inorganic fiber desirably comprises at least one inorganic material selected from the group consisting of silica-alumina, mullite, alumina, silica, titania, zirconia, silicon nitride, boron nitride, silicon carbide, and basalt.

In the honeycomb structured body of the present invention, the fiber length of the inorganic fiber is at least about 0.1 mm and at most about 100 mm.

In the honeycomb structured body of the present invention, the honeycomb structured body desirably comprises a laminate of lamination members having different cell dimensions.

The honeycomb structured body of the present invention is a honeycomb structured body comprising:

a plurality of cells that are placed in parallel with one another in a longitudinal direction with a cell wall therebetween; and a sealing portion sealing either one of the end portions of the cells, wherein said honeycomb structured body has a plurality of lamination members laminated in the longitudinal direction so that the cells are superposed on one another, said lamination members mainly composed of metal, and the honeycomb structured body has a porosity of at least about 70% and at most about 95% and having a length about 0.2 to about 0.9 times a diameter thereof, the length being in the longitudinal direction of the honeycomb structured body, and the diameter being of a cross-section perpendicular to the longitudinal direction of the honeycomb structured body.

In the honeycomb structured body of the present invention, a plate member made of metal is desirably laminated as a lamination member for the end portion on both ends of the laminated lamination members mainly composed of metal.

In the honeycomb structured body of the present invention, the metal is any one of the structured bodies selected from the group consisting of a structured body configured by three-dimensionally entangled metal fibers made of metal, a structured body having penetrating pores formed therein by a pore-forming material, and a structured body in which metal powder is sintered so that pores are allowed to remain.

In the honeycomb structured body of the present invention, the metal comprises either a chromium-based stainless steel or a chromium-nickel-based stainless steel.

The honeycomb structured body of the present invention is a honeycomb structured body comprising:

a plurality of pillar-shaped porous ceramic members, each having a plurality of cells placed in parallel with one another in a longitudinal direction with a cell wall therebetween, are combined with one another by interposing a sealing material layer; and a sealing portion sealing either one of the end portions of said cells, wherein the honeycomb structured body has a porosity of at least about 70% and at most about 95% and having a length about 0.2 to about 0.9 times a diameter thereof, the length being in the longitudinal direction of the honeycomb structured body, and the diameter being of a cross-section perpendicular to the longitudinal direction of the honeycomb structured body.

A honeycomb structured body of the present invention is a honeycomb structured body comprising:

a porous ceramic body having a plurality of cells placed in parallel with one another in the longitudinal direction with a cell wall therebetween; and a sealing portion sealing either one of the end portions of the cells, said porous ceramic body being sintered and formed into an integral form as a whole, wherein the honeycomb structured body has a porosity of at least about 70% and at most about 95% and having a length about 0.2 to about 0.9 times a diameter thereof, the length being in the longitudinal direction of the honeycomb structured body, and the diameter being of a cross-section perpendicular to the longitudinal direction of the honeycomb structured body.

DESCRIPTION OF THE EMBODIMENTS

Figure 1A:
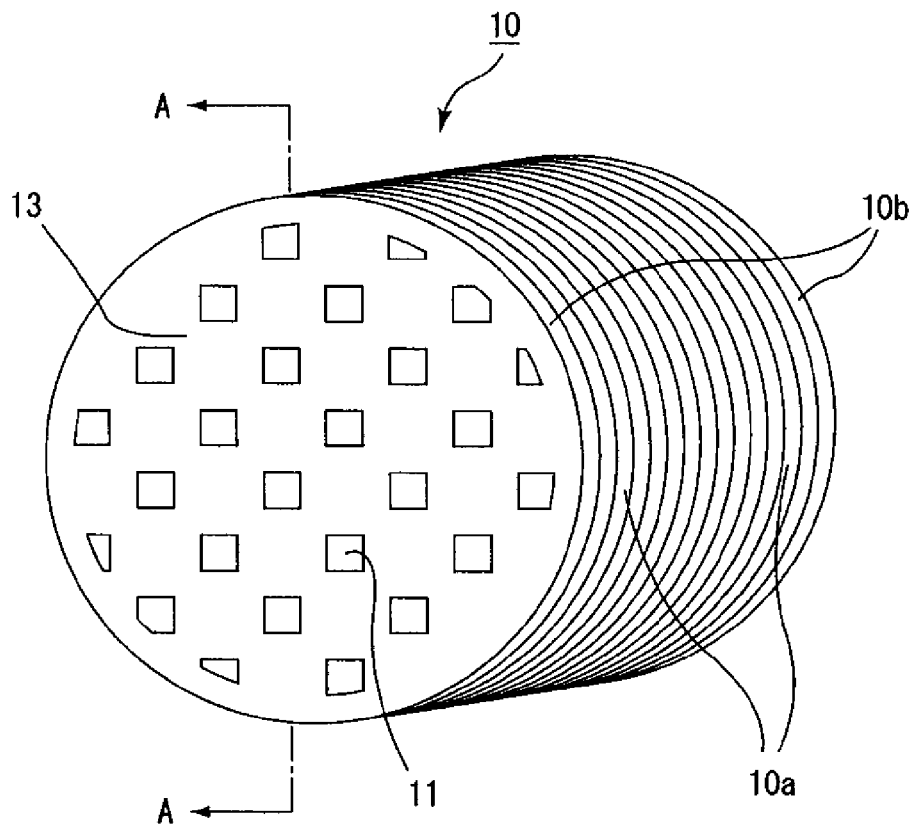
FIG. 1A is a perspective view that schematically shows one example of a honeycomb structured body according to an embodiment of the present invention.

The honeycomb structured body according to the embodiments of the present invention is a honeycomb structured body comprising a plurality of cells that are placed in parallel with one another in a longitudinal direction with a cell wall therebetween, and a sealing portion sealing either one of the end portions of the cells, wherein the honeycomb structured body has a porosity of at least about 70% and at most about 95% and having a length about 0.2 to about 0.9 times a diameter thereof, the length being in the longitudinal direction of the honeycomb structured body, and the diameter being of a cross-section perpendicular to the longitudinal direction of the honeycomb structured body.

The lower limit of the porosity in the honeycomb structured body according to the embodiments of the present invention is desirably set to about 70%, and the upper limit thereof is desirably set to about 95%.

The porosity of about 70% or more makes it easier for ashes generated upon burning particulates to pass through the cell walls, and causes difficulty for the ashes to deposit on the surface and the inside of the cell walls, making it easy to avoid an increase in pressure loss due to the deposited ashes. In contrast, the porosity of about 95% or less results in the unnecessity of making the walls thicker so as to increase the capture efficiency of particulates, so that the aperture ratio and/or the filtering area become large to prevent the pressure loss from increasing when exhaust gases flow in and out of the honeycomb structured body and/or pass through the inside of the honeycomb structured body. Consequently, the honeycomb structured body easily becomes sufficient in strength.

As described later, when a catalyst is supported on the honeycomb structured body according to the embodiments of the present invention, the above-mentioned porosity refers to the porosity after supporting of a catalyst.

Moreover, with respect to the aspect ratio of the above-mentioned honeycomb structured body, the lower limit value is set to about 0.2 and the upper limit value is set to about 0.9.

The aspect ratio of about 0.2 or more is less likely to increase the initial pressure loss, and depending on the shape of the exhaust gas purifying device for installing the honeycomb structured body, a problem such that the whole honeycomb structured body may not be effectively used is less likely to happen. In contrast, the aspect ratio of about 0.9 or less is less likely to provide large resistance to the exhaust gases passing through the inside of the cells to make it difficult for the pressure loss to become high.

Although the shape of the honeycomb structured body shown in the following drawings is a cylindrical shape, the shape of the honeycomb structured body according to the embodiments of the present invention is not limited to the cylindrical shape, and may be, for example, a cylindroid shape, a rectangular pillar shape or the like, and also may be any other shape.

In particular, in the case where the honeycomb structured body is placed right under an engine, since the space is extremely limited, the shape of the filter may also need to be formed into a complex shape.

In the case where a honeycomb structured body having a complex shape is manufactured, the laminated honeycomb structured body described later is desirably used. The honeycomb structured body of this type is suitably processed into a desired structure and shape.

Moreover, in the above-mentioned honeycomb structured body, the thickness of the cell wall is desirably set to about 0.6 mm or more. With such thickness, particulates can be easily captured inside the cell walls even when the porosity is high, thereby a high capture efficiency can be easily achieved.

Moreover, the upper limit value of the thickness of the cell wall is desirably set to about 5.0 mm.

If the thickness of the cell wall is too thick, the aperture ratio and/or filtering area become too small, causing an increase in the pressure loss. This arrangement also makes ashes difficult to escape. Moreover, supposing that the range in which deep-layer-filtering of the particulates is carried out is referred to as an effective region of the wall for soot capturing, the ratio at which the effective region occupies in the cell wall tends to easily decrease.

Moreover, with respect to the average pore diameter of the honeycomb structured body, although not particularly limited, the lower limit value is desirably set to about 1 μm, and the upper limit value is desirably set to about 100 μm. The average pore diameter of about 1 μm or more easily allows particulates to be deep-layer-filtered inside the cell wall, so that they are easily made in contact with the catalyst supported on the inside of the cell wall. In contrast, the average pore diameter of about 100 μm or less tends to cause difficulty for the particulates to pass through the pores, and thus it becomes easier for the particulates to be sufficiently captured so that the honeycomb structured body can sufficiently function as a filter.

The above-mentioned porosity and average pore diameter can be measured through known methods such as a mercury injection method using a mercury porosimeter, a weighing method, Archimedes method and a measuring method using a scanning electron microscope (SEM).

With respect to the cell density on the cross section perpendicular to the longitudinal direction of the honeycomb structured body, although not particularly limited, the lower limit thereof is desirably set to about 0.16 pc/cm$^2$ (about 1.0 pc/in$^2$), and the upper limit thereof is desirably set to about 93 pcs/cm$^2$ (about 600 pcs/in$^2$); more desirably, the lower limit value is set to about 0.62 pc/cm$^2$ (about 4.0 pcs/in$^2$), and the upper limit value is set to about 77.5 pcs/cm$^2$ (about 500 pcs/in$^2$).

Moreover, with respect to the size of the cell on the cross section perpendicular to the longitudinal direction of the honeycomb structured body, although not particularly limited, the lower limit thereof is desirably set to about 0.8 mm×about 0.8 mm, and the upper limit thereof is desirably set to about 16 mm×about 16 mm.

The aperture ratio of the honeycomb structured body is desirably set to a lower limit value of about 30% and an upper limit value of about 50%.

The aperture ratio of about 30% or more is less likely to cause an increase in pressure loss when exhaust gases flow in and out of the honeycomb structured body, and the aperture ratio about 50% or less tends to easily maintain a sufficient filtering area in an attempt to make the cell walls thicker, resulting in an difficulty of the increase in pressure loss and also a difficulty of the reduction in the strength of the honeycomb structured body.

Here, the aperture ratio of the honeycomb structured body refers to an aperture ratio on a cross section in the center of the honeycomb structured body, that is, an aperture ratio on a cross section obtained when the honeycomb structured body is cut perpendicularly to the longitudinal direction at the mid point in the longitudinal direction.

Further, in the above-mentioned honeycomb structured body, the cells may comprise two types of cells, that is, as to the entire end surface of the honeycomb structured body, an inlet-side cell group whose end portions at the outlet side are sealed with a plug in such a manner that the total area in the cross-section perpendicular to the longitudinal direction is relatively large, and an outlet-side cell group whose end portions at the inlet side are sealed with a plug in such a manner the total area in the above-mentioned cross section is relatively small.

With respect to the combination of the inlet-side cell group and the outlet-side cell group, examples thereof include: (1) a case where a respective cell constituting the inlet-side cell group and a respective cell constituting the outlet-side cell group have the same perpendicular cross-section area, and the number of cells constituting the inlet-side cell group is larger, (2) a case where a respective cell constituting the inlet-side cell group and a respective cell constituting the outlet-side cell group have a different perpendicular cross-section area, and the number of cells is also different, and (3) a case where, with respect to a respective cell constituting the inlet-side cell group and a respective cell constituting the outlet-side cell group, the cells constituting the inlet-side cell group have a larger perpendicular cross-section area, and the number of cells in both groups is the same.

Moreover, the cell constituting the inlet-side cell group and/or the cell constituting the outlet-side cell group may be constituted by one type of cell in which the shape, the perpendicular cross-section area and the like are the same, or may be constituted by two or more types of cells in which the shape, the perpendicular cross-section area and the like differ from one another.

The honeycomb structured body may also be supported with a catalyst.

In the honeycomb structured body, with a catalyst that can convert toxic gas components such as CO, HC, NOx in exhaust gases being supported thereon, it becomes easier for toxic gas components in the exhaust gases to be sufficiently converted by the catalytic reaction. Further, by supporting a catalyst that helps burning of particulates, particulates can be more easily or successively burned and removed. As a result, the above-mentioned honeycomb structured body allows the performance of converting exhaust gases to improve, and further allows to easily reduce the energy for burning particulates.

When the honeycomb structured body has a structure in which plural lamination members are laminated in the longitudinal direction, the catalyst may be supported on at least a portion of these lamination members.

Examples of the above-mentioned catalyst include: catalyst made of noble metal such as platinum, palladium, and rhodium, although not particularly limited thereto. In addition to these noble metals, an element, such as an alkali metal (Group 1 in Element Periodic Table), an alkali earth metal (Group 2 in Element Periodic Table), a rare-earth element (Group 3 in Element Periodic Table) and a transition metal element may be included to be supported thereon.

Moreover, when applying the catalyst to the honeycomb structured body, the surface of the honeycomb structured body may be coated with a catalyst supporting layer such as alumina in advance, and the catalyst may be applied thereto. Examples of the catalyst supporting layer include: oxide ceramics such as alumina, titania, zirconia, silica and ceria.

As described above, a honeycomb filter for capturing particulates in exhaust gases needs to be subjected to a regenerating process for burning particulates after having captured a certain amount of particulates. Even though such a regenerating process is carried out, ashes derived from engine oil and an engine, which are discharged and captured with particulates but remain even upon burning, remain left in the filter.

Here, when the honeycomb filter has a low porosity of about 50%, ash does not pass through the cell walls after regenerating processes, and the ash gradually accumulates on the cell wall and inside the cell. When ash is in this way accumulated on the cell walls and inside the cell, the pressure loss increases and, as a result, the honeycomb filter itself has to be exchanged.

Moreover, the pressure loss increases rapidly when ash is accumulated on the cell walls and inside cells, readily causing low mileage and damage to the engine.

Therefore, in this kind of honeycomb filter, in order to secure the space for accepting ash depending on the usage life of the vehicle in which it is installed, it is necessary to frequently detach the filter to remove ash, or to prepare a filter having a large volume.

Even when the honeycomb structured body according to the embodiments of the present invention is formed to have such a high porosity that the porosity exceeds about 70%, it becomes possible to sufficiently function as a filter, and in addition, by raising the porosity and setting the ratio of the length of the honeycomb structured body in the longitudinal direction to the diameter of the cross-section perpendicular to the longitudinal direction of the honeycomb structured body to a predetermined value, it becomes possible to maintain the pressure loss at a low level.

The honeycomb structured body according to an embodiment of the present invention has a high porosity of at least about 70% and at most about 95%, and therefore gases readily pass through the cell wall. Further, ash that remains after burning particulates is allowed to pass through the cell wall easily and to be discharged outside easily, thereby the rate of increase of the pressure loss due to accumulation of ash in the honeycomb structured body (on the cell wall) can be easily suppressed to a low level.

Moreover, since the aspect ratio of the honeycomb structured body according to the embodiments of the present invention is as small as at least about 0.2 and at most about 0.9, the resistance to the exhaust gases passing through the inside of the cells is likely to be small, thereby the pressure loss can be easily kept at a low level.

Thus, the honeycomb structured body according to the embodiments of the present invention, which has a high porosity and a low aspect ratio, can easily keep the pressure loss at a low level.

The specific modes of the honeycomb structured body according to the embodiments of the present invention are mainly divided into the following three modes.

The first mode is a mode in which a plurality of lamination members are laminated in the longitudinal direction so that the cells are superposed on one another (hereinafter, this mode of the honeycomb structured body is referred to also as a laminated honeycomb structured body); the second mode relates to a mode in which a plurality of pillar-shaped porous ceramic members, each having a plurality of cells formed in parallel with one another in the longitudinal direction with a cell wall therebetween, are combined with one another by interposing a sealing material layer (hereinafter, the honeycomb structured body of this mode is also referred to as an aggregated honeycomb structured body); and the third mode relates to a honeycomb structured body comprising a porous ceramic body which has been sintered and formed into an integral form as a whole (hereinafter, the honeycomb structured body of this mode is also referred to as an integral honeycomb structured body).

Among these, the laminated honeycomb structured body is more applicable for the honeycomb structured body according to the embodiments of the present invention.

This is because the laminated honeycomb structured body can be readily formed to have a porosity as high as about 70% or more, and is difficult to be damaged by thermal stress. Moreover, when the honeycomb structured body is configured so as to have the aspect ratio as described above, it becomes easier to decrease the number of lamination members to reduce the cost of manufacturing more easily.

Next, referring to the drawings, the following description will discuss the laminated honeycomb structured body.

Figure 1B:
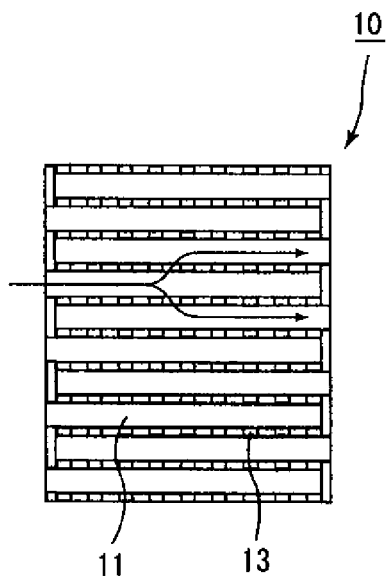
FIG. 1B is a cross-sectional view taken along line A-A of FIG. 1A.

FIG. 1A is a perspective view that schematically shows specific example of an embodiment of a laminated honeycomb structured body, and FIG. 1B is a cross-sectional view taken along line A-A of FIG. 1A.

A laminated honeycomb structured body 10 has a cylindrical shape in which a number of cells 11 with either one of ends being sealed are placed in parallel with one another in the longitudinal direction with a wall portion (cell wall) 13 therebetween.

In other words, as shown in FIG. 1B, the cell 11 has either one of ends corresponding to the inlet side or the outlet side of exhaust gases sealed so that exhaust gases that have flowed into one of the cells 11 are allowed to flow out of another cell 11 after passing through the cell wall 13 that separates the cells 11; thus, the cell wall 13 functions as a filter.

Here, the laminated honeycomb structured body 10 is manufactured as a laminated body formed by laminating lamination members 10a having a thickness of at least about 0.1 mm and at most about 20 mm, and the lamination members 10a are laminated so that the cells 11 are superposed on one another in the longitudinal direction.

Here, the expression, "the lamination members are laminated so that the cells are superposed on one another", refers to the fact that the lamination members are laminated so that the corresponding cells formed in adjacent lamination members are allowed to communicate with each other.

Moreover, on both ends of the laminated lamination members 10a, a plate member with a dense structure in which cells are formed in a checkered pattern is laminated as the lamination member 10b for the end portion.

Here, as the lamination member 10a, those which result to have a porosity of the cell wall of at least about 70% and at most about 95% are used. Thereby, the porosity of the cell wall can be more easily set to the above-mentioned range.

Further, the laminated honeycomb structured body has the aspect ratio of at least about 0.2 and at most about 0.9. The aspect ratio can be adjusted by taking the diameter of the lamination members 10a into consideration and adjusting the thickness, and the number to be laminated.

The respective lamination members may be bonded to each other by using an inorganic adhesive or the like, or may be simply laminated physically; and it is more desirable for the lamination members to be simply laminated physically. When the lamination members are simply laminated physically, it is possible to prevent the flow of exhaust gases from being blocked by a joining portion composed of the adhesive or the like, and consequently it becomes difficult for the pressure loss to be come high. Here, in the case of the structure in which the respective lamination members are simply laminated physically, a laminated body is formed by laminating the lamination members in a casing (a can-type metal body) to be attached to an exhaust pipe, and a pressure is applied thereto.

The laminated honeycomb structured body has a structure in which the lamination members are laminated in the longitudinal direction; therefore, even when a great temperature difference is generated over the entire filter upon regenerating process or the like, a temperature difference generated in each of the lamination members is small, and since the resulting thermal stress is also small, damage rarely occurs. For this reason, the laminated honeycomb structured body is easily designed to have a high porosity in order to provide a deep-layer filtering function inside the cell walls. Moreover, in particular, when the filter is formed into a complex shape, the filter becomes extremely fragile to a thermal stress; however, the laminated honeycomb structured body is less susceptible to damages even when made into a complex shape.

The lamination members constituting the laminated honeycomb structured body are desirably manufactured as lamination members mainly composed of inorganic fibers (hereinafter, referred to as an inorganic fiber lamination member) or lamination members mainly made of metal (hereinafter, referred to as a metal lamination member), because when those members constitute a honeycomb structured body having a high porosity, it becomes easier to prepare a honeycomb structured body superior in strength and heat resistance.

Upon laminating the respective lamination members, only the inorganic fiber lamination members may be laminated, or only the metal lamination members may be laminated.

Moreover, the inorganic fiber lamination members and the metal lamination members may be laminated in combination. Upon laminating these two types of members in combination, the order of lamination is not particularly limited.

Examples of the above-mentioned metal lamination members include; chromium-based stainless steel, chromium-nickel-based stainless steel and the like, although not particularly limited thereto.

Moreover, the above-mentioned metal lamination members are desirably a structured body configured by three-dimensionally entangled metal fibers made of the above-mentioned metal; a structured body which is made of the above-mentioned metal and has penetrating pores formed therein by a pore-forming material; a structured body in which metal powder, made of the above-mentioned metal, is sintered so that pores are allowed to remain, and the like.

Examples of the material for the inorganic fibers forming the inorganic fiber lamination member include: oxide ceramics such as silica-alumina, mullite, alumina, silica, titania and zirconia; nitride ceramics such as silicon nitride and boron nitride; carbide ceramics such as silicon carbide; basalt, and the like. Each of these materials may be used alone, or two or more of them may be used in combination.

Desirably, the lower limit value of the fiber length of the inorganic fibers is set to about 0.1 mm, and the upper limit value thereof is set to about 100 mm; more desirably, the lower limit value thereof is set to about 0.5 mm, and the upper limit value thereof is set to about 50 mm. Desirably, the lower limit value of the fiber diameter of the inorganic fibers is set to about 0.3 μm, and the upper limit value thereof is set to about 30 μm; and more desirably, the lower limit value thereof is set to about 0.5 μm, and the upper limit value thereof is set to about 15 μm.

In addition to the inorganic fibers, the above-mentioned inorganic fiber lamination member may contain a binder that unites these inorganic fibers to each other so as to maintain a predetermined shape.

Examples of the binder include: inorganic glass such as silicate glass, silicate alkali glass and borosilicate glass, alumina sol, silica sol and titania sol, and the like.

The inorganic fiber lamination member may contain a slight amount of inorganic particles and metal particles.

Moreover, in the inorganic fiber lamination member, the inorganic fibers may be firmly fixed with one another by an inorganic matter containing silica, and the like. In this case, desirably, the vicinity of each intersecting portion between the inorganic fibers is firmly fixed to each other. This structure can easily make the inorganic fiber lamination member become superior in the strength and flexibility.

Examples of the above-mentioned inorganic matter containing silica include: inorganic glass such as silicate glass, silicate alkali glass and borosilicate glass.

Moreover, a lamination member for the end portion in which cells are formed in a checkered pattern is desirably laminated on either end of the laminated inorganic fiber lamination members and metal lamination members.

By laminating the lamination member for the end portion, it is possible to seal either one of the end portions of each cell, without sealing the cell on the end portion with a plug.

The lamination member for the end portion may be manufactured as a member made of the same material as the in organic fiber lamination member and the metal lamination member, with cells formed in a checkered pattern, or as a plate member with a dense structure in which cells are formed in a checkered pattern.

In the present specification, the dense structure refers to a structure having a lower porosity than the lamination member, and examples of the specific material include metals, ceramics and the like.

In the case where the above-mentioned plate member with a dense structure is used, it becomes possible to more easily make the above-mentioned lamination member for the end portion thinner.

Moreover, with respect to the above-mentioned plate member with a dense structure, a plate member made of metal is desirably used.

Examples of the combinations between the lamination members and the lamination member for the end portion include: (1) combination in which an inorganic fiber lamination member is used as the lamination member, and as the lamination member for the end portion, an inorganic fiber lamination member for the end portion, a metal lamination member for the end portion, or a plate member having a dense structure is used, and (2) combination in which a metal lamination member is used as the lamination member, and as the lamination member for the end portion, an inorganic fiber lamination member for the end portion, a metal lamination member for the end portion, or a plate member having a dense structure is used.

In the case where a metal lamination member is used as the lamination member, it is desirable that a metal lamination member for the end portion or a plate member having a dense structure is used as the lamination member for the end portion.

In the case where the plate member having a dense structure is used as the lamination member for the end portion, in this case, it becomes possible to prevent leakage of soot from the sealing portion more easily.

Moreover, in the case where only metal lamination members are used as the lamination members and in the case where a plate member made of metal is further laminated on either end of the laminated inorganic fiber lamination members and metal lamination members, the resulting product is hardly eroded even after long time use.

Moreover, it becomes possible to prevent the occurrence of a gap with a casing (metal container) more easily, and a gap between the respective lamination members at a high temperature (in use) due to a difference in thermal expansion with the casing (metal container), and as a consequence, it may be considered that reduction in the capture efficiency caused by leakage of particulates in exhaust gases can be prevented more easily.

Further, in the laminated honeycomb structured body, as a lamination member, a lamination member mainly comprising porous ceramic (hereinafter also referred to as a ceramic lamination member) may also be used.

Examples of the material of the porous ceramic constituting the ceramic lamination member include: nitride ceramics such as aluminum nitride, silicon nitride, boron nitride and titanium nitride; carbide ceramics such as silicon carbide, zirconium carbide, titanium carbide, tantalum carbide and tungsten carbide; oxide ceramics such as alumina, zirconia, cordierite, mullite, silica and aluminum titanate; and the like. Here, the ceramic lamination member may be formed by two or more kinds of materials, such as a composite body of silicon and silicon carbide.

Moreover, in the above-mentioned laminated honeycomb structured body, when lamination members having different cell dimensions are manufactured and those are laminated one after another, irregularities are formed on the inner surface of each cell so that the filtering area becomes greater, and thus it is considered possible to further reduce the pressure loss more easily upon capturing particulates. Moreover, since the irregularities form the flow of exhaust gases into a turbulent flow, it is considered that the temperature difference in the filter can be made smaller to effectively prevent damage caused by a thermal stress more easily.

The shape of the cells on the plan view is not particularly limited to a quadrangular shape, and may be any optional shape, such as a triangle, a hexagon, an octagon, a dodecagon, a round shape and an elliptical shape.

Moreover, in the case where ceramic lamination members are laminated, lamination members for the end portion such as plate members having a dense structure may be laminated on either end of the ceramic lamination members.

Next, referring to FIG. 2, the following description will discuss a manufacturing method of the laminated honeycomb structured body according to an embodiment of the present invention.

(1) Manufacturing Method of the Metal Lamination Member

First, a porous metal plate, mainly made of metal having a thickness of at least about 0.1 mm and at most about 20 mm, is subjected to a laser machining process or a stamping process so that cells are formed over the almost entire face with almost equal intervals; thus, a lamination member having cells formed with a high density is manufactured.

Moreover, in the case of manufacturing a lamination member that is placed in the vicinity of the end face of the laminated honeycomb structured body and which forms the sealing portion of the cells, the cells thereof are formed in a checkered pattern upon the laser machining process so that a lamination member (lamination member for the end portion) having cells formed with a low density is manufactured.

By using one to several lamination members in which cells are formed with a low density at the end portions, a laminated honeycomb structured body capable of functioning as a filter can be obtained without carrying out the process of sealing predetermined cells at the end portion.

Next, a catalyst is supported on the metal lamination member depending on need.

More specifically, an oxide catalyst is formed on the surface of the metal lamination member, or an alumina film having a large specific surface area is formed on the surface of the metal lamination member and a catalyst such as platinum is adhered to the surface of the alumina film.

With respect to the method for supporting the oxide catalyst, for example, a method in which the metal lamination member is immersed for about 5 minutes in a solution containing about 10 g of $CZ(nCeO_2\text{-}mZrO_2)$, about 1 L (liter) of ethanol, about 5 g of citric acid and a proper amount of pH adjusting agent, and is then subjected to a firing process at about 500° C. is proposed.

In this method, it becomes easier to adjust the amount of catalyst to be adhered by repeating the above-mentioned immersing and firing processes.

With respect to the method for forming the alumina film on the surface of the metal lamination member, for example, a method in which the metal lamination member is impregnated with a solution of a metal compound containing aluminum such as $Al(NO_3)_3$ and then heated, and a method in which the metal lamination member is impregnated with a solution containing alumina powder and then heated are proposed.

With respect to the method for adhering a co-catalyst to the alumina film, for example, a method in which the metal lamination member is impregnated with a solution of a metal compound containing a rare-earth element or the like, such as $Ce(NO_3)_3$, and then heated, and other such methods may be described.

With respect to the method for adhering the catalyst to the alumina film, a method in which a metal lamination member is impregnated with, for example, a solution of diammine dinitro platinum nitric acid ($[Pt(NH_3)_2(NO_2)_2]HNO_3$) and then heated is proposed.

(2) Manufacturing Method of the Inorganic Fiber Lamination member

First, a sheet-forming slurry is prepared. More specifically, for example, with respect to 1 liter of water, inorganic fiber is dispersed at the rate of at least about 5 g and at most about 100 g, and in addition to that, with respect to 100 parts by weight of inorganic fiber, at least about 10 parts by weight and at most about 40 parts by weight of inorganic binder such as silica sol and at least about 1 part by weight and at most about 10 parts by weight of organic binder such as acrylic latex are added, and furthermore, a slight amount of coagulant (setting modifier) such as aluminum sulfate and a flocculant such as polyacrylamide are added depending on need, and sufficiently stirred to prepare a sheet-forming slurry.

Next, by using the sheet-forming slurry, a lamination member mainly composed of inorganic fibers is produced by a sheet-forming process.

Figure 2A:
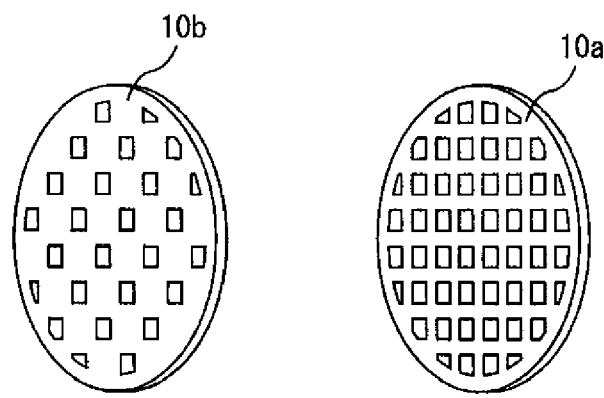
FIG. 2A is a perspective view that schematically shows lamination members that constitute a honeycomb structured body according to an embodiment of the present invention.

More specifically, the sheet-forming slurry is formed into a sheet by using a mesh, and the resulting product is dried at a temperature of at least about 100° C. and at most about 200° C., and this is then subjected to a stamping process to form cells over almost the entire face with equal intervals, so that an inorganic fiber lamination member having a predetermined thickness with cells formed therein with a high density, as shown in FIG. 2A, is obtained.

Moreover, in the case of manufacturing a lamination member that is placed at the vicinity of the end faces of the laminated honeycomb structured body and which forms the sealing portion of the cells, the sheet-forming slurry is formed into a sheet by using a mesh, and the resulting product is dried at a temperature of at least about 100° C. and at most about 200° C., and this is then subjected to a stamping process to form cells in a checkered pattern, so that an inorganic fiber lamination member (lamination member for the end portion) with predetermined cells formed therein with a low density is manufactured.

Moreover, in the case where an inorganic fiber lamination member with inorganic fibers being firmly fixed with one another by an inorganic matter such as inorganic glass is manufactured, inorganic fibers and inorganic particles made of the above-mentioned inorganic glass are mixed together upon preparation of the sheet-forming slurry, and after the slurry is made into a sheet and dried, the resulting product is subjected to a heating process at a temperature of at least about 900° C. and at most about 1050° C.

Furthermore, an acid treatment or a quenching treatment may be carried out thereafter, if necessary.

A catalyst may also be adhered to the inorganic fiber lamination member, if necessary.

In the case where the catalyst is adhered, oxide catalysts and catalysts composed of noble metal such as platinum may be preliminarily supported on the inorganic fibers such as alumina fibers that form a constituent material. By adhering the catalyst on the inorganic fibers prior to molding, it becomes possible to easily attach the catalyst in a more evenly dispersed state.

With respect to the method for supporting the catalyst on the inorganic fibers, examples thereof include: a method in which, after the inorganic fibers have been immersed with a slurry containing the oxide catalyst, the result is pulled out to be heated, and a method in which the inorganic fibers are immersed with a slurry containing the catalyst, pulled out therefrom and heated thereafter.

The catalyst may be adhered after the sheet-forming process.

(3) Manufacturing Method of the Ceramic Lamination Member

First, by using a material paste mainly composed of ceramics as mentioned above, a ceramic molded body having almost the same shape as the desired lamination member is manufactured, through molding methods such as extrusion molding and press molding.

With respect to the material paste, although not particularly limited, taking into consideration the porosity of the manufactured lamination members, a material paste in which a binder, a dispersant solution and the like are added to powders containing ceramics mentioned above may be used, for example.

Examples of the above-mentioned binder include: methyl cellulose, carboxymethyl cellulose, hydroxyethyl cellulose, polyethylene glycol and the like, although not particularly limited thereto.

In general, the compounding amount of the above-mentioned binder is desirably set to at least about 1 part by weight and at most about 10 parts by weight with respect to 100 parts by weight of the ceramic powder.

Examples of the dispersant solution include: an organic solvent such as benzene; alcohol such as methanol; water and the like, although not particularly limited thereto.

An appropriate amount of the above-mentioned dispersant solution is mixed therein so that the viscosity of the material paste is set within a fixed range.

The ceramic powder, binder and dispersant solution are mixed by an attritor or the like, and sufficiently kneaded by a kneader or the like, and then molded.

Moreover, a molding auxiliary may be added to the material paste, if necessary.

Examples of the molding auxiliary include ethylene glycol, dextrin, fatty acid soap, fatty acid, polyalcohol and the like, although not particularly limited thereto.

Moreover, according to desired porosity, balloons that are fine hollow spheres comprising oxide-based ceramics and a pore-forming agent such as spherical acrylic particles and graphite may be added to the above-mentioned material paste.

Examples of the above-mentioned balloons include: alumina balloons, glass micro-balloons, shirasu balloons, fly ash balloons (FA balloons), mullite balloons and the like, although not particularly limited thereto. Among these, fly ash balloons are more desirably used.

Next, after the above-mentioned ceramic molded body is dried by using a drier such as a microwave drier, a hot-air drier, a dielectric drier, a reduced-pressure drier, a vacuum drier and a freeze drier to form a ceramic dried body, the resulting product is subjected to degreasing and firing under a predetermined condition to thus manufacture a ceramic lamination member.

With respect to the conditions for degreasing and firing of the ceramic dried body, conditions that are used in the manufacture of a conventional filter comprising porous ceramics can be applied.

Then, a catalyst is adhered to the ceramic lamination member, if necessary. The method for adhering the catalyst is the same as that of the metal lamination member.

Further, if necessary, a plate member with a dense structure may be manufactured to be used as a lamination member for the end portion.

(4) Laminating Process of Lamination Members

Figure 2B:
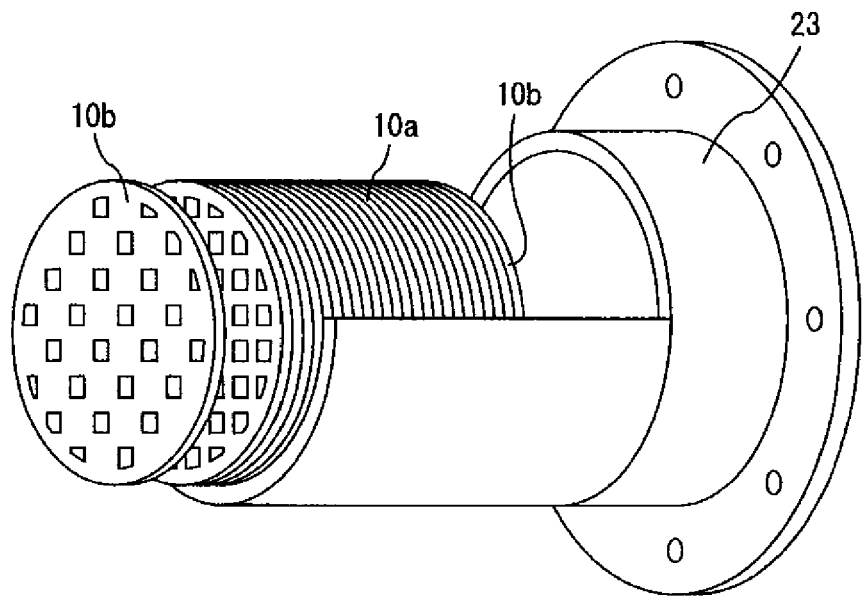
FIG. 2B is a perspective view that shows a state in which the lamination members shown in FIG. 2A are laminated to manufacture the honeycomb structured body.

As shown in FIG. 2B, a cylindrical-shaped casing (metal container) 23 having a pressing metal member on its one side is used, and after one to several of the lamination members 10b for the end portion, manufactured in the processes (1) to (3), have been laminated in the casing 23, a predetermined number of the lamination members 10a for the inner portion are laminated thereon. Lastly, one to several of the lamination members 10b for the end portion are laminated thereon, followed by pressing, and a pressing metal member is also placed and secured onto the other end so that a honeycomb structured body which has undergone a canning process is manufactured. Of course, in these processes, the respective lamination members are laminated in such a manner that the cells are superposed on one another.

Here, in the case where a plate member made of metal with a dense structure is used as the lamination members for the end portion, this may be subjected to a welding process to be used as the pressing member.

Moreover, in the case where a laminated honeycomb structured body is manufactured by using inorganic fiber lamination members, since the porosity decreases as the lamination members become thinner upon being subjected to pressing process, the lamination members need to be manufactured by taking this decrease into consideration.

Referring to the drawings, the following description will discuss the aggregated honeycomb structured body according to the embodiments of the present invention.

Figure 3:
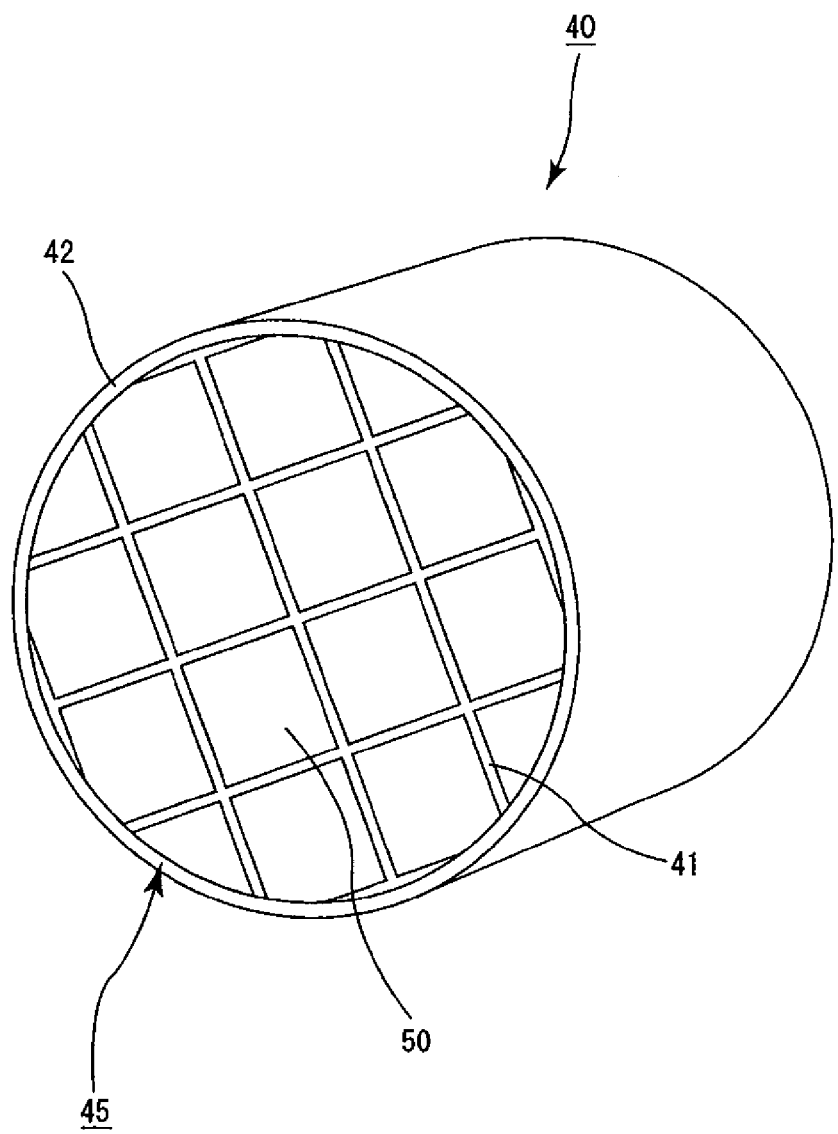
FIG. 3 is a perspective view that schematically shows one example of a honeycomb structured body according to an embodiment of the present invention.
Figure 4A:
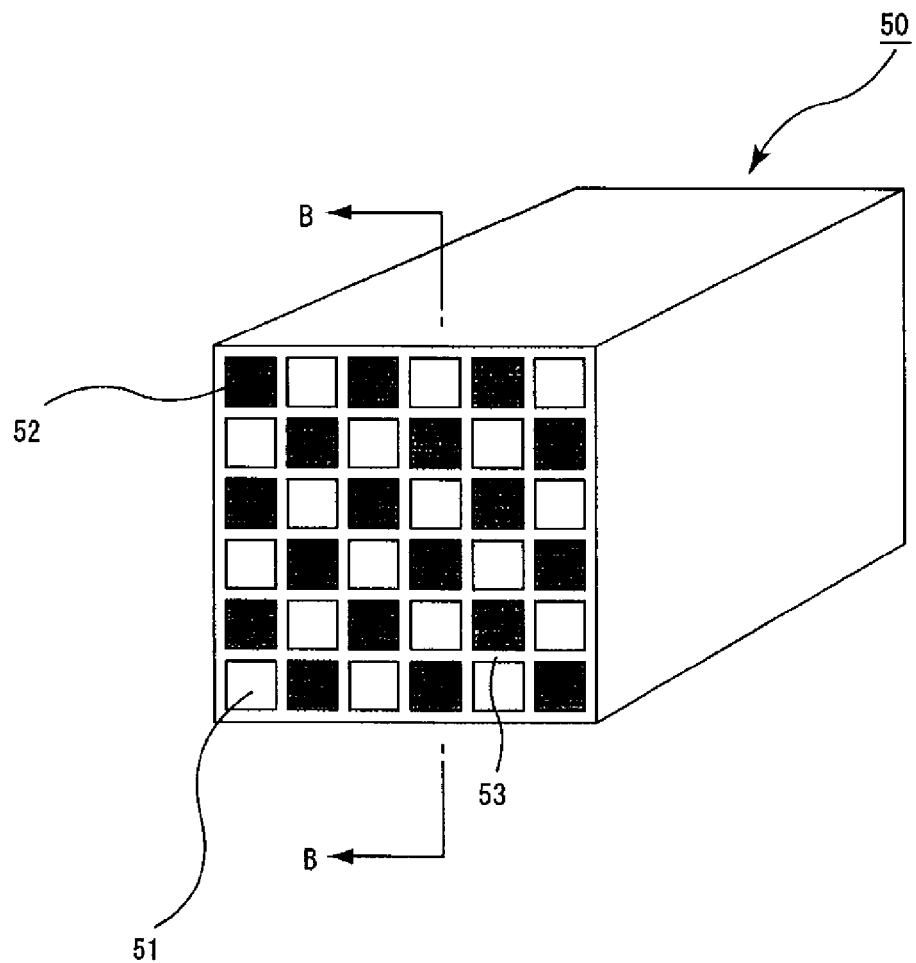
FIG. 4A is a perspective view that schematically shows porous ceramic members that constitute a honeycomb structured body according to an embodiment of the present invention.
Figure 4B:
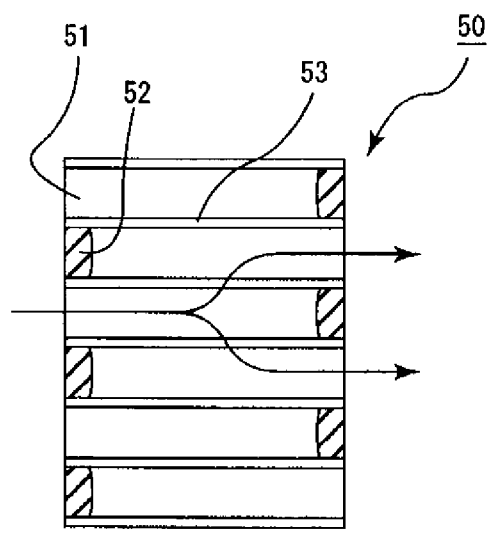
FIG. 4B is a cross-sectional view taken along line B-B of FIG. 4A.

FIG. 3 is a perspective view that schematically shows one example of the aggregated honeycomb structured body according to an embodiment of the present invention, FIG. 4A is a perspective view showing porous ceramic members that constitute the aggregated honeycomb structured body shown in FIG. 3, and FIG. 4B is a cross-sectional view taken along line B-B of the porous ceramic member shown in FIG. 4A.

As shown in FIG. 3, in the aggregated honeycomb structured body 40, a plurality of porous ceramic members 50 made of silicon carbide or the like are combined with one another by interposing a sealing material layer (adhesive layer) 41 to form a cylindrical ceramic block 45, and a sealing material layer (coat layer) 42 is formed on the periphery of this ceramic block 45.

As shown in FIGS. 4A and 4B, the porous ceramic member 50 has a number of cells 51 placed in parallel with one another in the longitudinal direction so that cell walls (wall portions) 53 that separate the cells 51 are allowed to function as filters. In other words, each of the cells 51 formed in the porous ceramic member 50 has either one of the ends on the inlet side or the outlet side of exhaust gases sealed with a plug 52 as shown in FIG. 4B so that exhaust gases that have flowed into one of the cells 51 are allowed to flow out of another cell 51 after surely having passed through a cell wall 53 that separates the cells 51.

With respect to the porous ceramic member 50, a porous ceramic member having the porosity of at least about 70% and at most about 95% is used.

Thus, the porosity of cell walls can be set to the above-mentioned range.

Further, the aggregated honeycomb structured body 40 has an aspect ratio of at least about 0.2 and at most about 0.9.

The aggregated honeycomb structured body 40 is mainly made of porous ceramic materials, and examples of the material include: nitride ceramics such as aluminum nitride, silicon nitride, boron nitride and titanium nitride; carbide ceramics such as silicon carbide, zirconium carbide, titanium carbide, tantalum carbide and tungsten carbide; and oxide ceramics such as alumina, zirconia, cordierite, mullite, silica and aluminum titanate. Here, the aggregated honeycomb structured body 40 may be formed by using two or more kinds of materials, such as a composite body of silicon and silicon carbide. In the case where the composite body of silicon and silicon carbide is used, silicon is desirably added thereto to make up at least about 5% by weight and at most about 45% by weight of the entire body.

With respect to the porous ceramic material, a silicon carbide-based ceramic is desirably used, since this material is superior in heat resistance, mechanical characteristics and has a high thermal conductivity. Here, the silicon carbide-based ceramic refers to a material having a silicon carbide content of about 60% by weight or more.

The plug 52 and the cell wall 53 that constitute the porous ceramic member 50 are desirably made of the same porous ceramic material. With this arrangement, the contact strength between the two members can be easily increased, and by adjusting the porosity of the plug 52 in the same manner as the cell walls 53, the coefficient of thermal expansion of the cell walls 53 and the coefficient of thermal expansion of the plug 52 are easily and properly adjusted so that it becomes possible to more easily prevent a gap from being generated between the plug 52 and the cell walls 53 due to a thermal stress upon production and in use and also to more easily prevent cracks from occurring in the plug 52 and at portions of the cell walls 53 that are made in contact with the plug 52. Here, the cell walls refer to both of the cell wall separating the cells 51 and the peripheral portion.

With respect to the thickness of the plug 52, although not particularly limited, in the case where the plug 52 is made of porous silicon carbide, it is desirably set to at least about 1 mm and at most about 20 mm, and more desirably in the range of about 2 mm to about 10 mm.

In the aggregated honeycomb structured body 40, the sealing material layer (adhesive layer) 41, which is formed between the porous ceramic members 50, also functions as an adhesive material used for binding a plurality of the porous ceramic members 50 to one another. In contrast, the sealing material layer (coat layer) 42, which is formed on the peripheral face of the honeycomb block 45, is also allowed to function as a sealing material used for preventing exhaust gases passing through the cells from leaking from the peripheral face of the honeycomb block 45 when the aggregated honeycomb structured body 40 is placed in an exhaust passage of an internal combustion engine, and as an reinforcing member for adjusting the shape of the honeycomb block 45.

Here, in the aggregated honeycomb structured body 40, the adhesive layer 41 and the coat layer 42 may be formed by using the same material, or may be formed by using different materials. In the case where the adhesive layer 41 and the coat layer 42 are made from the same material, the compounding ratio of materials thereof may be the same or may be different. Moreover, the material may have either a dense structure or a porous structure.

Examples of the material used for forming the adhesive layer 41 and the coat layer 42 include, although not particularly limited, a material comprising inorganic fibers and/or inorganic particles in addition to an inorganic binder and an organic binder, may be used.

Examples of the material to the above-mentioned inorganic binder include silica sol, alumina sol and the like. Each of these materials may be used alone, or two or more kinds of these may be used in combination. Of the above-mentioned inorganic binders, silica sol is more desirably used.

Examples of the organic binder include polyvinyl alcohol, methyl cellulose, ethyl cellulose, carboxymethyl cellulose and the like. Each of these may be used alone or two or more kinds of these may be used in combination. Among the organic binders, carboxymethyl cellulose is more desirably used.

Examples of the inorganic fibers include ceramic fiber such as silica-alumina, mullite, alumina, and silica. Each of these may be used alone, or two or more kinds of these may be used in combination. Among the inorganic fibers, silica-alumina fibers are more desirably used.

Examples of the inorganic particles include carbides, nitrides and the like, more specifically, inorganic powder made of silicon carbide, silicon nitride, boron nitride and the like. Each of these may be used alone, or two or more kinds of these may be used in combination. Among the above-mentioned inorganic particles, silicon carbide, which is superior in thermal conductivity, is more desirably used.

Moreover, balloons that are fine hollow spheres composed of oxide-based ceramics and a pore-forming agent such as spherical acrylic particles and graphite may be added to the above-mentioned paste used for forming the sealing material layer, if necessary.

Examples of the above-mentioned balloons include, although not particularly limited, alumina balloons, glass micro-balloons, shirasu balloons, fly ash balloons (FA balloons), mullite balloons and the like. Among these, alumina balloons are more desirably used.

Next, the following description will discuss a manufacturing method of the aggregated honeycomb structured body according to the embodiments of the present invention.

First, an extrusion-molding process is carried out by using material paste mainly composed of the above-mentioned ceramic material so that a square-pillar shaped ceramic molded body is manufactured.

With respect to the particle diameter of the ceramic powder, although not particularly limited, those which are less susceptible to shrinkage in the succeeding firing process are desirably used, and for example, those powders, prepared by combining 100 parts by weight of powders having an average particle diameter of at least about 0.3 µm and at most about 70 µm with at least about 5 parts by weight and at most about 65 parts by weight of powders having an average particle diameter of at least about 0.1 µm and at most about 1.0 µm, are preferably used.

Adjusting the firing temperature and the particle diameter of the ceramic powder makes it possible to adjust the pore diameter and the like of the porous ceramic member.

Here, the ceramic powder may be subjected to an oxidizing treatment.

Examples of the above-mentioned binder include, although not particularly limited, methylcellulose, carboxy methylcellulose, hydroxy ethylcellulose, polyethylene glycol and the like.

In general, the compounding amount of the above-mentioned binder is desirably set to at least about 1 part by weight and at most about 15 parts by weight with respect to 100 parts by weight of the ceramic powder.

Examples of the dispersant solution include, although not particularly limited, an organic solvent such as benzene; alcohol such as methanol; water, and the like.

An appropriate amount of the above-mentioned dispersant solution is mixed therein so that the viscosity of the material paste is set within a fixed range.

These ceramic powder, binder and dispersant solution are mixed by an attritor or the like, and sufficiently kneaded by a kneader or the like, and then extrusion-molded.

Moreover, a molding auxiliary may be added to the material paste, if necessary.

Examples of the molding auxiliary include, although not particularly limited, ethylene glycol, dextrin, fatty acid, fatty acid soap, polyvinyl alcohol and the like.

Moreover, in order to provide a desired porosity, balloons that are fine hollow spheres composed of oxide-based ceramics and a pore-forming agent such as spherical acrylic particles and graphite may be added to the above-mentioned material paste.

Examples of the above-mentioned balloons include, although not particularly limited, alumina balloons, glass micro-balloons, shirasu balloons, fly ash balloons (FA balloons), mullite balloons and the like. Among these, alumina balloons are more desirably used.

Next, the above-mentioned ceramic molded body is dried by using a drier such as a microwave drier, a hot-air drier, a dielectric drier, a reduced-pressure drier, a vacuum drier and a frozen drier so that a ceramic dried body is formed. Thereafter, a predetermined amount of plug material paste, which forms plugs, is injected into the end portion on the outlet side of the inlet-side group of cells and the end portion on the inlet side of the outlet-side group of cells so that the cells are sealed.

With respect to the plug material paste, although not particularly limited, such paste as to set the porosity of a plug produced through the succeeding processes to at least about 60% and at most about 95% is desirably used, and for example, the same paste as the material paste may be used.

Next, the ceramic dried body filled with the plug material paste is subjected to degreasing (for example, at least about 200° C. and at most about 500° C.) and firing processes (for example, at least about 1400° C. and at most about 2300° C.) under predetermined conditions so that a porous ceramic member 50, made from porous ceramic materials and constituted by a single sintered body as a whole, is manufactured.

Here, with respect to the degreasing and firing conditions of the ceramic dried body, it is possible to apply conditions that have been conventionally used for manufacturing a filter made from porous ceramic materials.

Next, an adhesive paste to form the adhesive layer 41 is applied to each of the side faces of the porous ceramic member 50 with an even thickness to form an adhesive paste layer, and by repeating a process for successively laminating another porous ceramic member 50 on this adhesive paste layer, a porous ceramic member aggregated body having a predetermined size is manufactured.

With respect to the material for forming the adhesive paste, since it has been explained, the explanation thereof is omitted.

Next, the porous ceramic member aggregated body is heated so that the adhesive paste layer is dried and solidified to form the adhesive layer 41.

Moreover, the porous ceramic member aggregated body in which a plurality of the porous ceramic members 50 are combined with one another by interposing an adhesive layer 41 is subjected to a cutting process by using a diamond cutter and the like so that a ceramic block 45 having a cylindrical shape is manufactured.

By forming a sealing material layer 42 on the outer periphery of the honeycomb block 45 by using the sealing material paste, a honeycomb structured body 40, in which the sealing material layer 42 is formed on the peripheral portion of the cylindrical ceramic block 45 comprising a plurality of the porous ceramic members 50 combined with one another by interposing an adhesive layer 41, can be manufactured.

Thereafter, if necessary, a catalyst is supported on the honeycomb structured body. The catalyst may be supported on the porous ceramic members prior to manufacturing the aggregated body.

The following description will discuss an integral honeycomb structured body according to the embodiments of the present invention with reference to Figures.

Figure 5A:
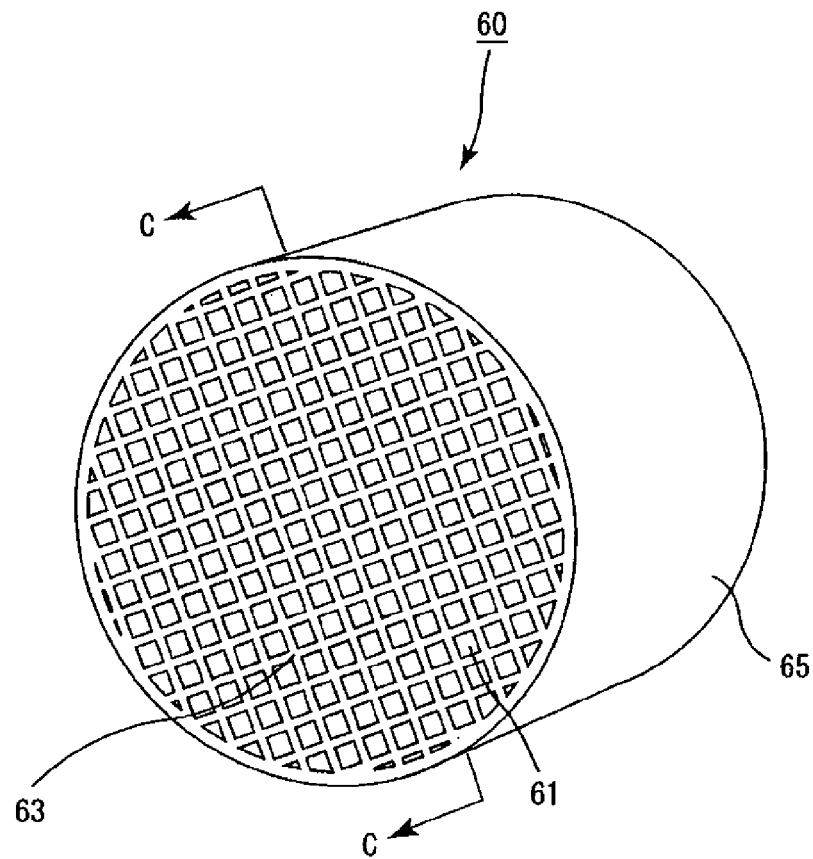
FIG. 5A is a cross-sectional view that schematically shows one example of a honeycomb structured body according to an embodiment of the present invention.
Figure 5B:
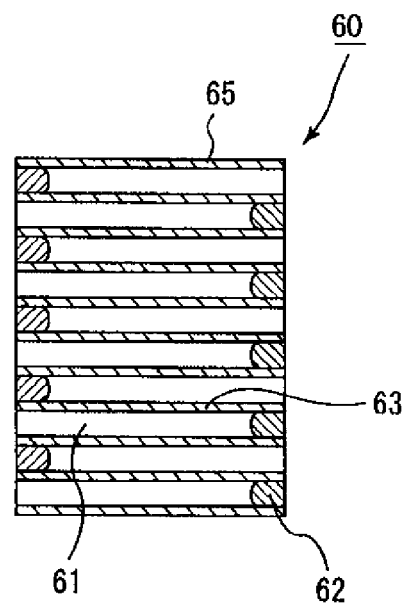
FIG. 5B is a cross-sectional view taken along line C-C of FIG. 5A.

FIG. 5A is a perspective view that schematically shows another one example of a honeycomb structured body according to an embodiment of the present invention, and FIG. 5B is a cross-sectional view taken along line C-C of FIG. 5A.

As shown in FIG. 5A, the integral honeycomb structured body 60 is formed by a cylindrical ceramic block 65 comprising a porous ceramic in which a plurality of cells 61 are placed in parallel with one another in the longitudinal direction with a cell wall (wall portion) 63 therebetween. Here, the cell wall refers to both the cell walls that separate the cells 61 from one another, and the outer periphery of the ceramic block.

As shown in FIG. 5B, in the integral honeycomb structured body 60, the ceramic block 65 has a structure in which either one of the end portions of the cell 61 is sealed with a plug 62.

In other words, in the ceramic block 65 of the integral honeycomb structured body 60, predetermined cells 61 are sealed by the plugs 62 at one of the end portions, and at the other end portion of the ceramic block 65, the cells 61 that have not been sealed by the plugs 62 are sealed by the plugs 62.

In this structure, exhaust gases that have flowed into one cell 61 are always allowed to flow out of another cell 61 after having passed through the cell wall 63 separating the cells 61 so that the cell wall 63 separating the cells 61 from each other is allowed to function as a particle capturing filter more easily.

Further, with respect to the ceramic block 65, a ceramic block having a porosity of at least about 70% and at most about 95% is used.

The aspect ratio of the integral honeycomb structured body 60 is at least about 0.2 and at most about 0.9.

Although not shown in FIG. 5, in the same manner as the aggregated honeycomb structured body 40 shown in FIG. 3, a sealing material layer (coat layer) may be formed on the periphery of the ceramic block 65.

With respect to the porous ceramic material constituting the integral honeycomb structured body, for example, the same porous ceramic material forming the above-mentioned aggregated honeycomb structured body may be used.

Among those materials, oxide ceramics such as cordierite and aluminum titanate may be preferably used. This material cuts manufacturing costs, and has a comparatively low coefficient of thermal expansion so that breakage during the use is less apt to happen.

In the integral honeycomb structured body according to the embodiments of the present invention, with respect to the material for the plug, the thickness of cell walls, the material for the sealing material layer, etc., those factors that are the same as those of the aggregated honeycomb structured body may be used; therefore, detailed description thereof is omitted herein.

The following description will discuss one example of a manufacturing method of the integral honeycomb structured body according to the embodiments of the present invention.

First, an extrusion-molding process is carried out by using material paste mainly composed of the above-mentioned ceramic material so that a cylindrical ceramic molded body to form a ceramic block is manufactured. Here, except that the shape of the molded body is a cylinder and that the dimension is larger in comparison with the porous ceramic member, the same binder, dispersant and the like as those of the aggregated honeycomb structured body are used and the molded body is formed by using the same method; therefore, detailed description thereof is omitted herein.

Next, in the same manner as the manufacturing process of the aggregated honeycomb structured body according to the embodiments of the present invention, the above-mentioned ceramic molded body is dried by using a drier such as a microwave drier, a hot-air drier, a dielectric drier, a reduced-pressure drier, a vacuum drier and a frozen drier so that a ceramic dried body is formed. Thereafter, a predetermined amount of plug material paste, which forms a plug, is injected into the end portion on the outlet side of the inlet-side group of cells and the end portion on the inlet side of the outlet-side group of cells so that the cells are sealed.

Thereafter, in the same manner as the manufacturing process of the aggregated honeycomb structured body according to the embodiments of the present invention, the degreasing and firing processes are carried out to manufacture a ceramic block, and the sealing material layer is formed according to need so that an integral honeycomb structured body is manufactured. Moreover, a catalyst may be supported on the integral honeycomb structured body by using the above-mentioned method.

Although the use of the honeycomb structured body according to the embodiments of the present invention is not particularly limited, it is preferably applied to an exhaust gas purifying device for a vehicle.

Figure 6:
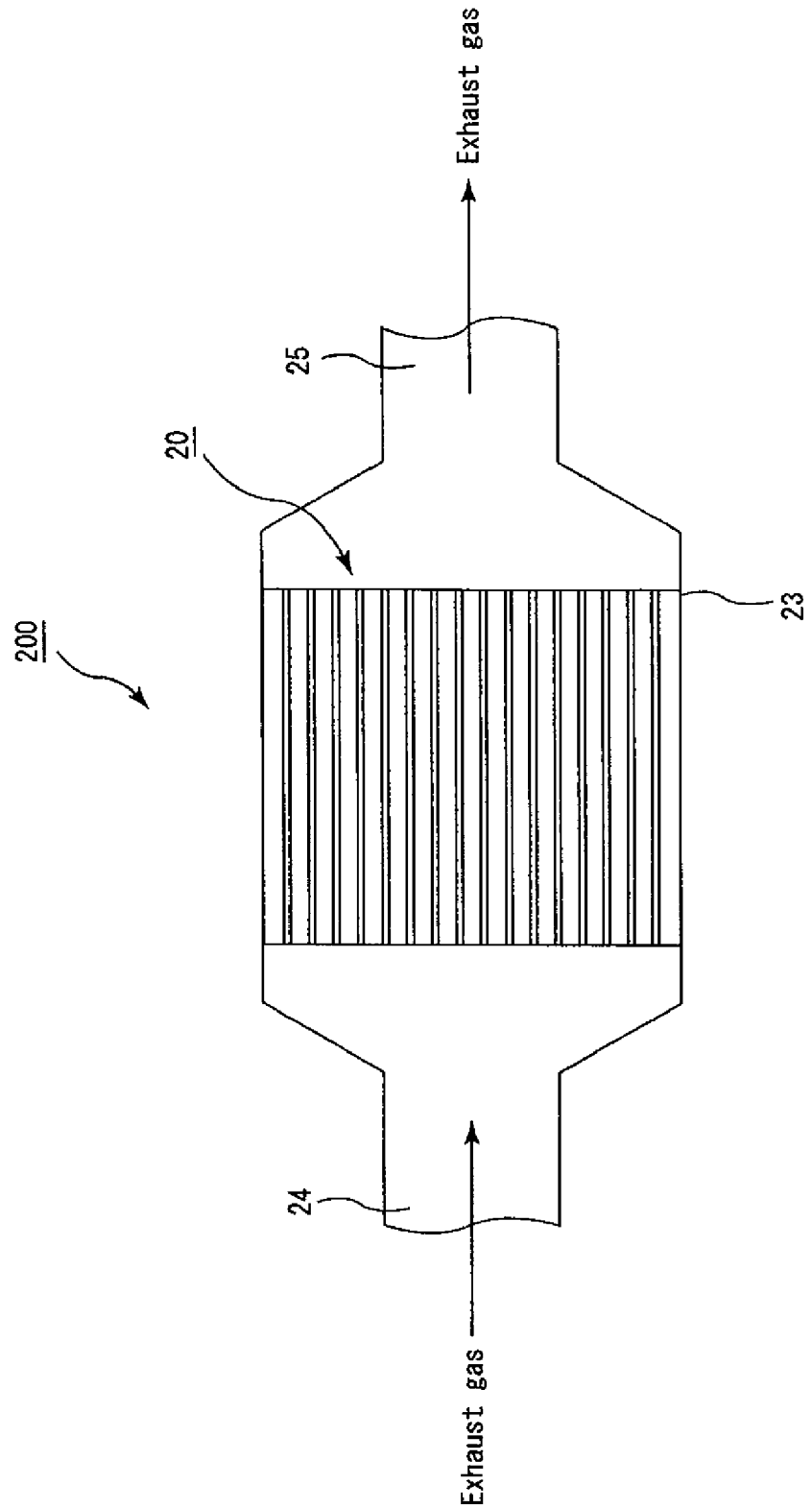
FIG. 6 is a cross-sectional view that schematically shows one example of an exhaust gas purifying device for a vehicle with a honeycomb structured body according to an embodiment of the present invention installed therein.

FIG. 6 is a cross-sectional view that schematically shows one example of the exhaust gas purifying device with the honeycomb structured body according to an embodiment of the present invention installed therein.

As shown in FIG. 6, an exhaust gas purifying device 200 has a structure in which the honeycomb structured body 20 is covered with the casing 23; an introducing pipe 24 connecting to an internal combustion system such as an engine is connected to the end of the casing 23 on the side to which exhaust gases are introduced; and an exhaust pipe 25 externally coupled is connected to the other end of the casing 23. Here, in FIG. 6, the arrow indicates the flow of exhaust gases.

In the exhaust gas purifying device 200 having the above-mentioned configuration, exhaust gases, discharged from an internal combustion system such as an engine, are introduced into the casing 23 through the introducing pipe 24, and allowed to pass through the cell walls of the honeycomb structured body 20. After particulates have been captured by the cell walls and the exhaust gases are purified, the resulting exhaust gases are discharged outside through the exhaust pipe 25.

When particulates are deposited on the cell walls of the honeycomb structured body 20, a regenerating process of the honeycomb structured body 20 is carried out.

The regenerating process of the honeycomb structured body 20 means burning of the captured particulates, and examples of the process for regeneration of the honeycomb structured body of the present invention include: a post-injection method, a method for heating the honeycomb structured body by a heating means provided at the side at which the exhaust gas flows in, a method for continuously progressing the regenerating process by placing on the filter a catalyst which is capable of directly oxidizing particulates which are solid objects, and a method in which $NO_x$ is oxidized by an oxide catalyst provided at the upper stream side of the honeycomb structured body so that NO$_2$ is generated, and particulates are oxidized using the generated NO$_2$, and the like.

EXAMPLES

The following description will discuss the present invention in detail by means of examples; however, the present invention is not intended to be limited by these examples.

Example 1

(1) Preparation Process of Sheet-forming Slurry

First, alumina fibers (50 parts by weight), glass fibers (average fiber diameter: 9 μm, average fiber length: 3 mm) (50 parts by weight) and an organic binder (polyvinyl alcohol-based fibers) (10 parts by weight) were dispersed in a sufficient amount of water, and this was sufficiently stirred to prepare a sheet-forming slurry.

(2) Sheet-forming Process and Cell-forming Process

The slurry obtained in the process (1) was formed into a sheet by using a mesh having a diameter of 197 mm, and the resulting product was dried at 135° C. so that a sheet-shaped inorganic composite body having a diameter of 197 mm and a thickness of 5 mm was obtained. Next, this was subjected to a stamping process so that cells having a cell density of 3.72 pcs/cm$^2$ and a cell-wall thickness (space between the cells) of 2 mm were formed over the entire face of the sheet-shaped inorganic composite body.

(3) Heating Treatment Process

The sheet-shaped inorganic composite body obtained in the process (2) was subjected to a heating treatment at 950° C. for one hour with a pressure being applied thereto so that an inorganic fiber lamination member was obtained. Here, in this process, the alumina fibers are anchored with one another through glass.

(4) Acid Treatment and Quenching Treatment

The inorganic fiber lamination member obtained in the process (3) was immersed in 4 mol/L of a HCl solution at 90° C. for one hour to be subjected to an acid treatment, and was then subjected to a quenching treatment at 1050° C. for 5 hours. Thus, the resulting member had a porosity of 80% and a thickness of 1 mm.

(5) Manufacture of Lamination Member for the End Portion (Metal Plate-type Member)

A Ni—Cr alloy metal plate was machined into a disc shape of 197 mm in diameter×1 mm in thickness, and then further subjected to a laser machining process so that a lamination member for the end portion (metal plate-type member) in which cells were formed in a checkered pattern, with a cell density of about 1.8 to 1.9 pcs/cm$^2$ and a cell-wall thickness (space between the cells) of 2 mm was manufactured.

Here, in the lamination member for the end portion, cells were formed in a checkered pattern, and the cell density was almost half that of the lamination member.

(6) Laminating Process

First, in a separated process, a casing (a can-type metal casing) to one side of which a pressing metal member was attached was placed with the side bearing the metal member attached thereto facing down. After one of the lamination members for the end portion (metal plate-type member) obtained in the process (5) had been laminated, 56 of the inorganic fiber lamination members obtained in the process (4) were laminated thereon, and lastly, one of the lamination members for an end portion (metal plate-type member) was laminated thereon. The resulting product was further subjected to a pressing process, and then another pressing metal member was also put on the other side and secured thereon so that a honeycomb structured body having a laminated body with a length of 39.4 mm was obtained. Here, the honeycomb structured body, manufactured through the pressing process, had a porosity of 70%.

In this process, the respective sheets were laminated in such a manner that the cells were superposed on one another.

Examples 2 to 16

Basically, the same processes as those in Example 1 were carried out, and the diameter of the mesh was adjusted according to the diameter of the honeycomb structured body, the number of inorganic fiber lamination members to be laminated was adjusted according to the length and porosity of the honeycomb structured body, the space between the cells upon stamping process was adjusted according to the thickness of the cell wall, and the degree of compression upon heating treatment process was adjusted according to the thickness and porosity at the time of sheet-forming to obtain honeycomb structured bodies having structures as shown in Tables 1-1 and 2-1.

In Examples 2 to 4, after lamination members having a porosity of 80% and thickness of 1 mm were laminated, the resulting body was subjected to pressing process to form a honeycomb structured body with a porosity of 70%. In Examples 5 to 12, after lamination members having a porosity of 90% and thickness of 1 mm were laminated, the resulting body was subjected to pressing process to form a honeycomb structured body with a porosity of 85%. In Examples 13 to 16, after lamination members having a porosity of 98% and thickness of 1 mm were laminated, the resulting body was subjected to pressing process to form a honeycomb structured body with a porosity of 95%.

Example 17

(1) Manufacture of Lamination Member

A three-dimensional net-like metal porous member made of a Ni—Cr—W type alloy (product name: MA23 manufactured by Mitsubishi Materials Corp.; average pore diameter: 35 μm, porosity: 85%, thickness: 1 mm) was machined into a disc shape of 145 mm in diameter, and then further subjected to a laser machining process so that a metal lamination member in which cells were formed in almost the whole surface, with a cell density of 12.4 pcs/cm$^2$ and a cell-wall thickness (space between cells) of 1.1 mm was manufactured.

(2) Laminating Process

A casing (can-type metal container) to one side of which a pressing metal member was attached was placed, with the side bearing the metal member attached thereto facing down. Then, through the same method in process (5) of Example 1, a lamination member for the end portion (metal plate-type member) in which cells are formed in checkered patterns at a predetermined position was manufactured. After one of the lamination members for the end portion (metal plate-type member) had been laminated, 71 of the above-mentioned metal lamination members were laminated thereon, and lastly, one of the lamination members for an end portion (metal plate-type member), which was the same member as the one mentioned above, was laminated thereon. The resulting product was further subjected to a pressing process, and then another pressing metal member was also put on the other side and secured thereon to obtain a honeycomb structured body having a laminated body with a length of 72.5 mm was obtained.

Example 18

A honeycomb structured body was obtained through the same processes as in Example 17 except that the diameter of the metal plate and the length of the honeycomb structured body were set to the values as shown in Table 1-1.

Example 19

Coarse powder of α-type silicon carbide having an average particle diameter of 50 μm (3190 parts by weight) and fine powder of α-type silicon carbide having an average particle diameter of 0.5 μm (1370 parts by weight) were wet-mixed, and to the resulting mixture were added and kneaded 980 parts by weight of acrylic particles having an average particle diameter of 60 μm, 700 parts by weight of an organic binder (methyl cellulose), and an appropriate amount of water to obtain a mixed composition.

Next, to the above-mentioned mixed composition were added 330 parts by weight of a plasticizer (trade name: UNILUBE, made by NOF Corp.) and 150 parts by weight of glycerin serving as a lubricant, followed by kneading, and then extrusion-molded to manufacture a raw molded body having a rectangular pillar shape as shown in FIG. 4.

After the above-mentioned raw molded body had been dried by using a microwave drier or the like to manufacture a ceramic dried body, predetermined cells were filled with a plug material paste having the same composition as the raw molded body.

After this had been again dried by using a drier, the resulting product was degreased at 400° C., and fired at 2200° C. in a normal-pressure argon atmosphere for 3 hours to manufacture a porous ceramic member 50, which was a silicon carbide sintered body with a porosity of 70% and an average pore diameter of 35 μm, having a size of 34.3 mm×34.3 mm×72.5 mm, the number of cells 51 (cell density) of 41.9 pcs/cm$^2$ and a thickness of the cell walls 53 of 0.6 mm.

By using a heat resistant adhesive paste containing 30% by weight of alumina fibers having an average fiber length of 20 μm, 21% by weight of silicon carbide particles having an average particle diameter of 0.6 μm, 15% by weight of silica sol, 5.6% by weight of carboxymethyl cellulose and 28.4% by weight of water, a number of porous ceramic members 50 were bonded to one another, followed by cutting by a diamond cutter to manufacture a cylindrical-shaped ceramic block 45.

Next, 23.3% by weight of ceramic fibers made from alumina silicate (shot content: 3%, an average fiber length: 100 μm) which served as inorganic fibers, 30.2% by weight of silicon carbide powder having an average particle diameter of 0.3 μm which served as inorganic particles, 7% by weight of silica sol (SiO$_2$ content in the sol: 30% by weight) which served as an inorganic binder, 0.5% by weight of carboxymethyl cellulose which served as an organic binder, and 39% by weight of water were mixed and kneaded to prepare a sealing material paste.

Next, a sealing material paste layer having a thickness of 0.2 mm was formed on the peripheral portion of the ceramic block 45 by using the above-mentioned sealing material paste. Further, this sealing material paste layer was dried at 120° C. so that a cylindrical-shaped aggregated honeycomb structured body 40 having a size of 145 mm in diameter×72.5 mm in length and an aperture ratio of 37.4% was manufactured.

Example 20

A honeycomb structured body was manufactured through the same processes as in Example 19, except that the diameter and length of the honeycomb structured body were set to the values as shown in Table 1-1.

Comparative Examples 1 to 8

Basically, the same processes as those in Example 1 were carried out, and the diameter of the mesh was adjusted according to the diameter of the honeycomb structured body, the number of inorganic fiber lamination members to be laminated was adjusted according to the length and porosity of the honeycomb structured body, the space between the cells upon stamping process was adjusted according to the thickness of the cell wall, and the degree of compression upon the heating treatment process was adjusted according to the thickness and porosity at the time of sheet-forming, to obtain honeycomb structured bodies having structures as shown in Tables 1-2 and 2-2.

In Comparative Examples 1 and 2, after lamination members having a porosity of 80% and thickness of 1 mm were laminated, the resulting body was subjected to pressing process to form a honeycomb structured body with a porosity of 70%. In Comparative Examples 3 and 4, after lamination members having a porosity of 90% and thickness of 1 mm were laminated, the resulting body was subjected to pressing process to form a honeycomb structured body with a porosity of 85%. In Comparative Examples 5 and 6, after lamination members having a porosity of 98% and thickness of 1 mm were laminated, the resulting body was subjected to pressing process to form a honeycomb structured body with a porosity of 95%. In Comparative Example 7, after lamination members having a porosity of 80% and thickness of 1 mm were laminated, the resulting body was subjected to pressing process to form a honeycomb structured body with a porosity of 65%. In Comparative Example 8, lamination members having a porosity of 98% and thickness of 1 mm were laminated to form a honeycomb structured body with a porosity of 98%.

Comparative Example 9

A honeycomb structured body was manufactured through the same processes in Example 17, except that a three-dimensional net-like metal porous member made of a Ni—Cr—W based alloy having a porosity of 65% was used in process (1) of Example 17.

Comparative Example 10

Coarse powder of α-type silicon carbide having an average particle diameter of 50 μm (5710 parts by weight) and fine powder of α-type silicon carbide having an average particle diameter of 0.5 μm (2450 parts by weight) were wet-mixed, and to the resulting mixture were added 340 parts by weight of acrylic particles having an average particle diameter of 60 μm, 700 parts by weight of an organic binder (methyl cellulose), and an appropriate amount of water, and then kneaded to obtain a mixed composition.

Next, 330 parts by weight of a plasticizer (UNILUBE made by NOF Corp.) and 150 parts by weight of (glycerin) serving as a lubricant were added to the obtained mixed composition, and further kneaded and extrusion-molded to manufacture a raw molded body having a rectangular pillar shape as shown in FIG. 4.

Next, as in Example 19, a plug material paste was filled into the cells, followed by drying and firing, to manufacture a porous ceramic member 50 with a porosity of 50% and an average pore diameter of 35 μm, having a size of 34.3 mm×34.3 mm×72.5 mm, the number of cells 51 (cell density) of 41.9 pcs/cm$^2$ and a thickness of the cell walls 53 of 0.6 mm.

Thereafter, through the same process as in Example 19, a cylindrical ceramic block 45 in which a plurality of porous ceramic members 50 are bonded to one another was manufactured, and a sealing material on the outer peripheral portion of the ceramic block 45 were formed to manufacture a cylindrical aggregated honeycomb structured body 40 having the size of 145 mm in diameter×72.5 mm in length and an aperture ratio of 37.4%.

Tables 1-1 and 1-2 show the diameter, length, capacity and porosity of the manufactured honeycomb structured bodies in Example 1 to 20 and Comparative Example 1 to 10, as well as the number of laminated lamination members with respect to the honeycomb structured bodies formed by laminating the lamination members, the aspect ratio of inorganic fibers composing the lamination members, and the pore diameter of pores inside the honeycomb structured bodies.

Further, Tables 2-1 and 2-2 show the thickness of cell walls constituting the manufactured honeycomb structured body in Example 1 to 20 and Comparative Example 1 to 10, and the cell density and aperture ratio of the honeycomb structured body. Tables 2-1 and 2-2 also show the pressure loss, the pressure loss after regeneration, the increase rate of pressure loss after 100 times of regeneratng process and initial capture efficiency of the honeycomb structured body, which were measured by evaluation methods as described below.

Evaluation (1) Measurement of Initial Pressure Loss

Figure 7:
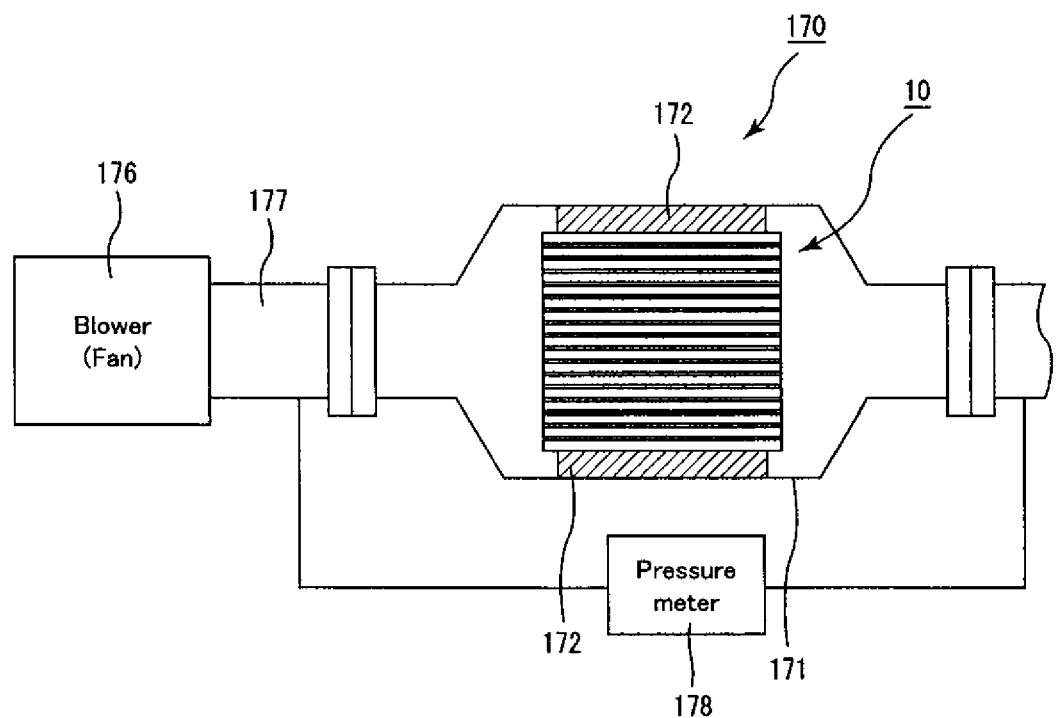
FIG. 7 is an explanatory drawing that shows a pressure loss measuring device.

Measurement was carried out using a pressure loss measuring device 170 as shown in FIG. 7. FIG. 7 is an explanatory drawing of the pressure loss measuring device.

This pressure loss measuring device 170 has a configuration in which a honeycomb structured body 10 with an alumina mat 172 wound thereon and fixed inside a metal casing 171 is placed in an exhaust gas pipe 177 of a blower (fan) 176, and a pressure meter 178 is installed so as to be capable of detecting the pressure at the front and back of the honeycomb structured body 10.

The blower 176 was driven such that the amount of flowing exhaust gases was 750 m³/h, and measurement was carried out on the difference in pressure (pressure loss) after 5 minutes had lapsed from the start of driving.

The result was as shown in Tables 2-1 and 2-2.

Here, with respect to the honeycomb structured bodies of Examples 1 to 18 and Comparative Examples 1 to 9, those honeycomb structured bodies were manufactured by being laminated inside a metal casing as described above; thus, measurement was carried out by placing them in the exhaust gases without the alumina mat being wound around the honeycomb structured body. On the other hand, with respect to the honeycomb structured bodies of Example 19 and 20, and Comparative Example 10, measurement was carried out with the alumina mat being wound around the honeycomb structured body, as shown in FIG. 7.

(2) Measurement of Pressure Loss After 100 Times of Regenerating Process

The honeycomb structured body in accordance with the Examples and Comparative Examples was used as an exhaust gas purifying device and placed at the exhaust path of an engine. The engine was driven at the number of revolutions of 2000 min⁻¹ with a torque of 40 Nm, for 90 minutes. Thereafter, a regenerating process by a post-injection method was carried out for 100 times and the pressure loss immediately after completion of 100 times of the regenerating process was measured. The measurement of the pressure loss was carried by the same method as that for the above-mentioned measurement of initial pressure loss. Before carrying out the measurement, it was visually observed that there was no leakage of particulates.

The result was as shown in Tables 2-1 and 2-2.

(3) Measurement of Initial Capture Efficiency

Figure 8:
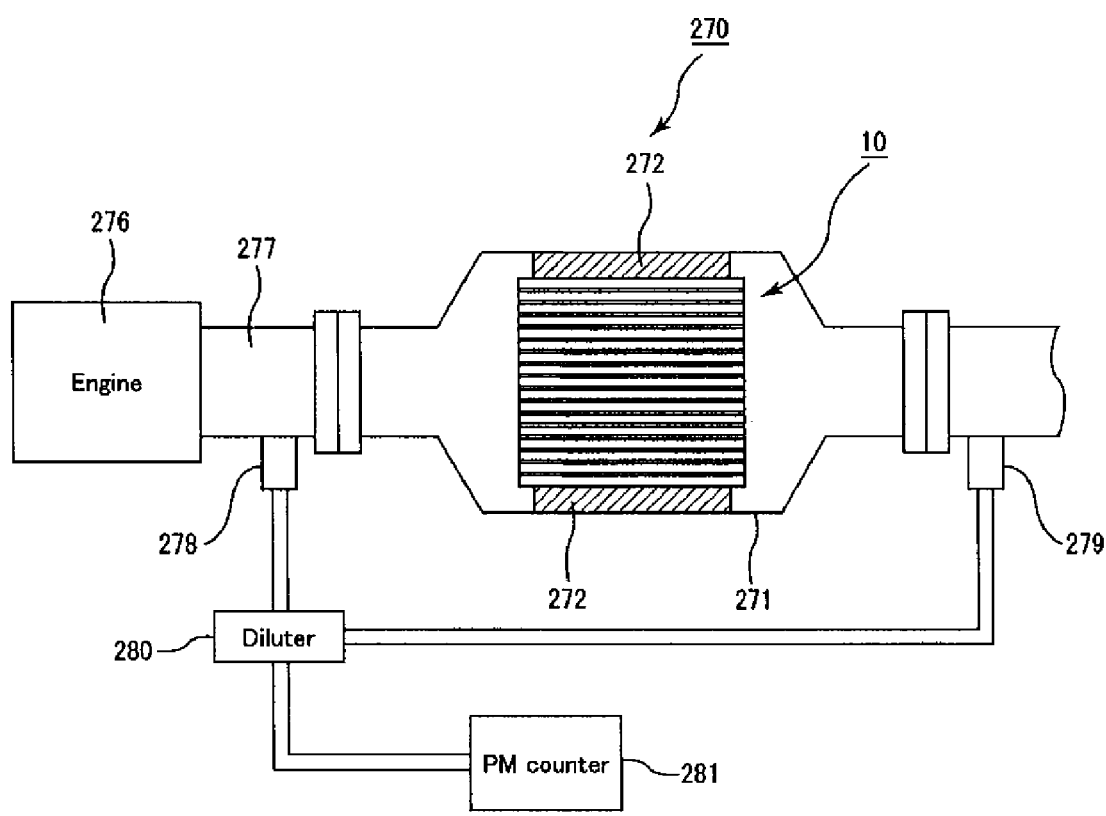
FIG. 8 is an explanatory drawing that shows a capture efficiency measuring device.

Measurement was carried out using a capture efficiency measuring device 270 as shown in FIG. 8. FIG. 8 is an explanatory drawing of the capture efficiency measuring device.

The capture efficiency measuring device 270 was structured as a Scanning Mobility Particle Sizer (SMPS) provided with a 2 L common-rail-type diesel engine 276, an exhaust gas pipe 277 that allows exhaust gases from the engine 276 to flow therein, a metal casing 271 that is connected to the exhaust gas pipe 277 and houses the honeycomb structured body 10 on which an alumina mat 272 is wounded, a sampler 278 that samples exhaust gases prior to flowing through the honeycomb structured body 10, a sampler 279 that samples exhaust gases after flowing through the honeycomb structured body 10, a diluter 280 for diluting the exhaust gases sampled by the samplers 278 and 279, and a PM counter 281 (made by TSI Inc., Condensation Particle Counter 3022A-S) that measures the amount of particulates contained in the diluted exhaust gases.

Next, measuring procedures are described; the engine 276 was driven at the number of revolutions of 2000 min⁻¹ with a torque of 47 Nm so that exhaust gases from the engine 276 were allowed to flow through the honeycomb structured body 10. In this case, $P_0$, the amount of PM prior to flowing through the honeycomb structured body 10, and $P_1$, the amount of exhaust gases after flowing through the honeycomb structured body 10 were confirmed based upon the number of PM particles counted by using the PM counter 281. Then, the capture efficiency was calculated using the following equation (1):

Capture efficiency(%)=$(P_0-P_1)/P_0 \times 100$ (1)

The results are shown in Tables 2-1 and 2-2.

As described in the above-mentioned (1) Measurement of initial pressure loss, the honeycomb structured bodies of Examples 1 to 18 and Comparative Examples 1 to 9 were manufactured by being laminated inside the metal casing; thus, measurement was carried out by placing the honeycomb structured bodies in the exhaust gases without the alumina mat wound around the periphery of the honeycomb structured body. On the other hand, measurement was carried out on the honeycomb structured bodies of Examples 19 and 20 and Comparative Example 10 with the alumina mat wound around the respective honeycomb structured bodies, as shown in FIG. 8.

TABLE 1-1

|  | Diameter (mm) | Length (mm) | Number of lamination members (number) | Aspect ratio | Capacity (L) | Porosity(*) (%) | Pore diameter (μm) |
|---|---|---|---|---|---|---|---|
| Example 1 | 197.0 | 39.4 | 56 | 0.20 | 1.20 | 70 | 35 |
| Example 2 | 145.0 | 72.5 | 106 | 0.50 | 1.20 | 70 | 35 |
| Example 3 | 129.7 | 90.8 | 133 | 0.70 | 1.20 | 70 | 35 |
| Example 4 | 119.2 | 107.3 | 158 | 0.90 | 1.20 | 70 | 35 |

TABLE 1-1-continued

|  | Diameter (mm) | Length (mm) | Number of lamination members (number) | Aspect ratio | Capacity (L) | Porosity(*) (%) | Pore diameter (μm) |
|---|---|---|---|---|---|---|---|
| Example 5 | 197.0 | 39.4 | 56 | 0.20 | 1.20 | 85 | 35 |
| Example 6 | 145.0 | 72.5 | 106 | 0.50 | 1.20 | 85 | 35 |
| Example 7 | 129.7 | 90.8 | 133 | 0.70 | 1.20 | 85 | 35 |
| Example 8 | 119.2 | 107.3 | 158 | 0.90 | 1.20 | 85 | 35 |
| Example 9 | 197.0 | 39.4 | 56 | 0.20 | 1.20 | 85 | 35 |
| Example 10 | 145.0 | 72.5 | 106 | 0.50 | 1.20 | 85 | 35 |
| Example 11 | 129.7 | 90.8 | 133 | 0.70 | 1.20 | 85 | 35 |
| Example 12 | 119.2 | 107.3 | 158 | 0.90 | 1.20 | 85 | 35 |
| Example 13 | 197.0 | 39.4 | 94 | 0.20 | 1.20 | 95 | 35 |
| Example 14 | 145.0 | 72.5 | 176 | 0.50 | 1.20 | 95 | 35 |
| Example 15 | 129.7 | 90.8 | 221 | 0.70 | 1.20 | 95 | 35 |
| Example 16 | 119.2 | 107.3 | 263 | 0.90 | 1.20 | 95 | 35 |
| Example 17 | 145.0 | 72.5 | 71 | 0.50 | 1.20 | 85 | 35 |
| Example 18 | 129.7 | 90.8 | 89 | 0.70 | 1.20 | 85 | 35 |
| Example 19 | 145.0 | 72.5 | — | 0.50 | 1.20 | 70 | 35 |
| Example 20 | 129.7 | 90.8 | — | 0.70 | 1.20 | 70 | 35 |

(Note)
(*)porosity (%) upon further carrying out pressing process after lamination

TABLE 1-2

|  | Diameter (mm) | Length (mm) | Number of lamination members (number) | Aspect ratio | Capacity (L) | Porosity(*) (%) | Pore diameter (μm) |
|---|---|---|---|---|---|---|---|
| Comparative Example 1 | 216.7 | 32.5 | 46 | 0.15 | 1.20 | 70 | 35 |
| Comparative Example 2 | 115.2 | 115.2 | 170 | 1.00 | 1.20 | 70 | 35 |
| Comparative Example 3 | 216.7 | 32.5 | 46 | 0.15 | 1.20 | 85 | 35 |
| Comparative Example 4 | 115.2 | 115.2 | 170 | 1.00 | 1.20 | 85 | 35 |
| Comparative Example 5 | 216.7 | 32.5 | 76 | 0.15 | 1.20 | 95 | 35 |
| Comparative Example 6 | 115.2 | 115.2 | 283 | 1.00 | 1.20 | 95 | 35 |
| Comparative Example 7 | 145.0 | 72.5 | 123 | 0.50 | 1.20 | 65 | 35 |
| Comparative Example 8 | 145.0 | 72.5 | 71 | 0.50 | 1.20 | 98 | 35 |
| Comparative Example 9 | 145.0 | 72.5 | 71 | 0.50 | 1.20 | 65 | 35 |
| Comparative Example 10 | 145.0 | 72.5 | — | 0.50 | 1.20 | 50 | 35 |

(Note)
(*)porosity (%) upon further carrying out pressing process after lamination

TABLE 2-1

|  | Thickness of cell wall (mm) | Cell density (pcs/cm$^2$) | Aperture ratio (%) | Pressure loss (kPa) | Pressure loss after regeneration (kPa) | Increase rate of pressure loss (%) | Initial capture efficiency (%) |
|---|---|---|---|---|---|---|---|
| Example 1 | 2.0 | 3.7 | 37.7 | 14.6 | 16.3 | 11.6 | 95 |
| Example 2 | 1.1 | 12.4 | 37.5 | 13.6 | 15.4 | 13.2 | 91 |
| Example 3 | 0.6 | 41.9 | 37.4 | 13.4 | 15.1 | 12.7 | 86 |
| Example 4 | 1.1 | 12.4 | 37.5 | 14.4 | 16.1 | 11.8 | 93 |
| Example 5 | 1.1 | 12.4 | 37.5 | 14.4 | 16.0 | 11.1 | 88 |
| Example 6 | 2.0 | 3.7 | 37.7 | 13.6 | 15.1 | 11.0 | 92 |
| Example 7 | 1.1 | 12.4 | 37.5 | 13.5 | 14.9 | 10.4 | 90 |
| Example 8 | 0.6 | 41.9 | 37.4 | 14.2 | 15.8 | 11.3 | 87 |
| Example 9 | 0.43 | 77.5 | 38.6 | 14.5 | 16.1 | 11.0 | 78 |
| Example 10 | 0.43 | 77.5 | 38.6 | 13.5 | 15.0 | 11.1 | 80 |
| Example 11 | 0.43 | 77.5 | 38.6 | 13.4 | 14.9 | 11.2 | 81 |
| Example 12 | 0.43 | 77.5 | 38.6 | 14.3 | 15.9 | 11.2 | 83 |
| Example 13 | 1.1 | 12.4 | 37.5 | 14.2 | 15.4 | 8.5 | 86 |
| Example 14 | 1.1 | 12.4 | 37.5 | 13.4 | 14.7 | 9.7 | 89 |

TABLE 2-1-continued

|  | Thickness of cell wall (mm) | Cell density (pcs/cm²) | Aperture ratio (%) | Pressure loss (kPa) | Pressure loss after regeneration (kPa) | Increase rate of pressure loss (%) | Initial capture efficiency (%) |
|---|---|---|---|---|---|---|---|
| Example 15 | 1.1 | 12.4 | 37.5 | 13.3 | 14.6 | 9.8 | 89 |
| Example 16 | 1.1 | 12.4 | 37.5 | 14.2 | 15.5 | 9.2 | 90 |
| Example 17 | 1.1 | 12.4 | 37.5 | 13.7 | 15.2 | 10.9 | 91 |
| Example 18 | 1.1 | 12.4 | 37.5 | 13.5 | 15.0 | 11.1 | 92 |
| Example 19 | 0.6 | 41.9 | 37.4 | 14.3 | 16.2 | 13.3 | 96 |
| Example 20 | 0.6 | 41.9 | 37.4 | 14.2 | 16.0 | 12.7 | 96 |

TABLE 2-2

|  | Thickness of cell wall (mm) | Cell density (pcs/cm²) | Aperture ratio (%) | Pressure loss (kPa) | Pressure loss after regeneration (kPa) | Increase rate of pressure loss (%) | Initial capture efficiency (%) |
|---|---|---|---|---|---|---|---|
| Comparative Example 1 | 2.0 | 3.7 | 37.7 | 16.2 | 18.1 | 11.7 | 89 |
| Comparative Example 2 | 1.1 | 12.4 | 37.5 | 16.1 | 18.0 | 11.8 | 88 |
| Comparative Example 3 | 1.1 | 12.4 | 37.5 | 16.0 | 17.8 | 11.3 | 86 |
| Comparative Example 4 | 0.6 | 41.9 | 37.4 | 16.3 | 18.1 | 11.0 | 88 |
| Comparative Example 5 | 1.1 | 12.4 | 37.5 | 16.1 | 17.7 | 9.9 | 85 |
| Comparative Example 6 | 1.1 | 12.4 | 37.5 | 16.3 | 17.9 | 9.8 | 91 |
| Comparative Example 7 | 1.1 | 12.4 | 37.5 | 13.8 | 18.6 | 34.8 | 95 |
| Comparative Example 8 | 1.1 | 12.4 | 37.5 | Erosion observed | — | — | — |
| Comparative Example 9 | 1.1 | 12.4 | 37.5 | 13.9 | 18.9 | 36.0 | 94 |
| Comparative Example 10 | 0.6 | 41.9 | 37.4 | 14.5 | 21.2 | 46.2 | 98 |

Figure 9:
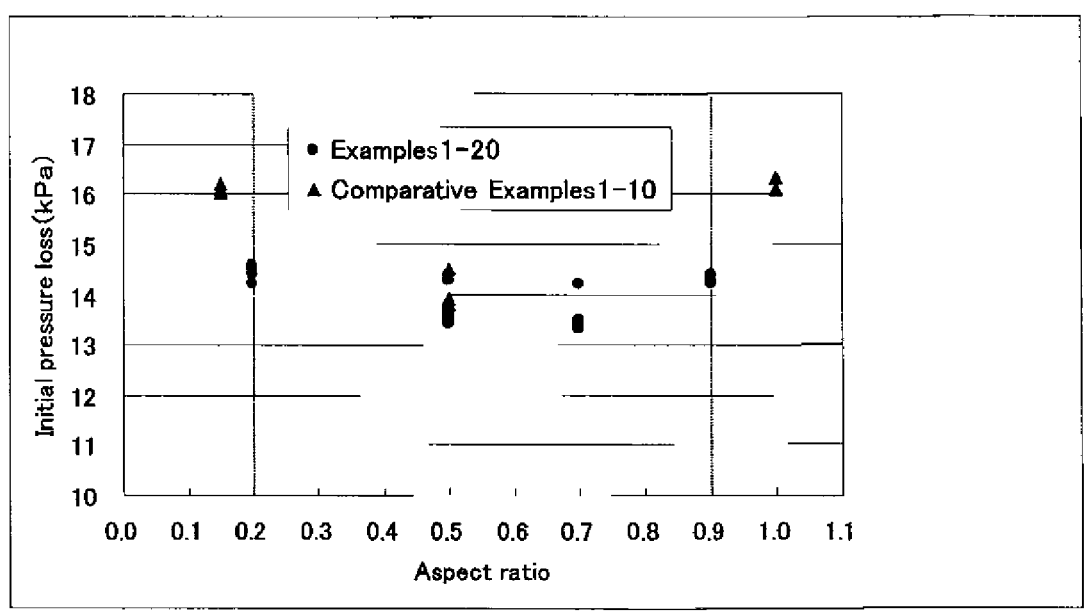
FIG. 9 is a graph showing the relationship between the aspect ratio and the initial pressure loss (kPa) of the respective honeycomb structured bodies according to Examples 1 to 20 and Comparative Examples 1 to 10.

It became clear that, as shown in Tables 1-1, 1-2, 2-1 and 2-2, the honeycomb structured bodies in accordance with the Examples were as low as 14.6 kPa or less in initial pressure loss when the aspect ratio was in the range of 0.2 to 0.9. In contrast, when the aspect ratio was not within the above-mentioned range as with the honeycomb structured bodies in accordance with the Comparative Examples, the initial pressure loss became as high as 16.0 kPa or more (see FIG. 9).

Figure 10:
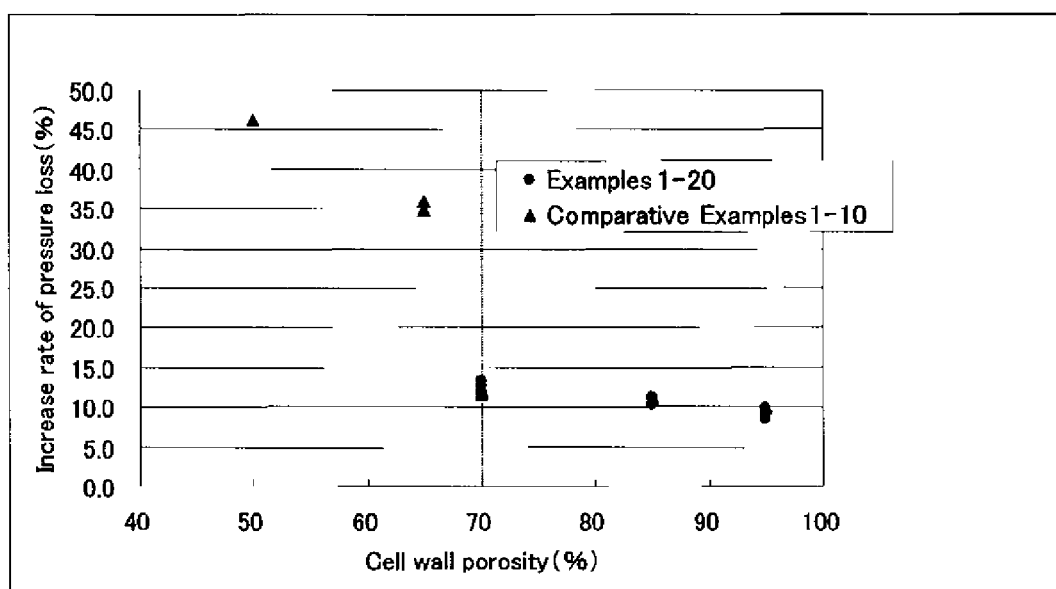
FIG. 10 is a graph showing the relationship between the cell wall porosity (%) and the increase rate of pressure loss (%) of the respective honeycomb structured bodies according to Examples 1 to 20 and Comparative Examples 1 to 10.

Further, as is clear from comparing the honeycomb structured bodies according to the Examples with the honeycomb structured bodies according to the Comparative Examples, when the porosity of cell walls was less than 70%, the increase rate of pressure loss after 100 times of regenerating process was large (see FIG. 10). In contrast, when the porosity of cell walls exceeded 95%, the honeycomb structured body suffered an intensive erosion such that it could not be allowed to function as a filter.

Figure 11:
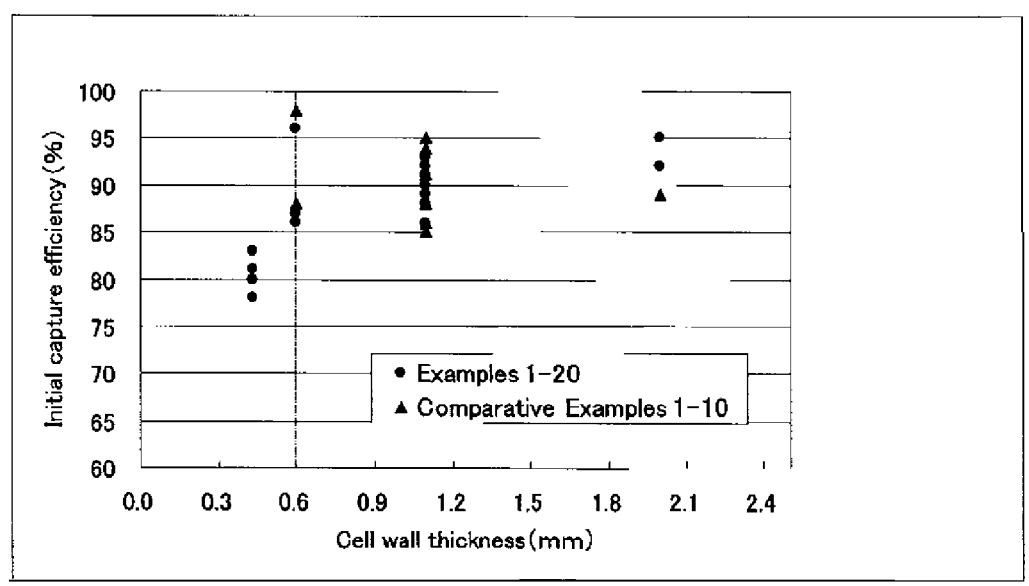
FIG. 11 is a graph showing the relationship between the cell wall thickness (mm) and the initial capture efficiency (%) of the respective honeycomb structured bodies according to Examples 1 to 20 and Comparative Examples 1 to 10.

It also became clear that the thickness of cell wall under 0.6 mm tends to deteriorate the initial capture efficiency (see FIG. 11).

What is claimed as new and desired to be secured by Letters Patent of the United States is:

1. A honeycomb structured body comprising:
   a plurality of cells that are placed in parallel with one another in a longitudinal direction with a cell wall therebetween; and
   a sealing portion sealing either one of the end portions of the cells,
   wherein the honeycomb structured body has a porosity of at least about 70% and at most about 95% and having a length about 0.2 to about 0.9 times a diameter thereof, the length being in the longitudinal direction of the honeycomb structured body, and the diameter being of a cross-section perpendicular to the longitudinal direction of the honeycomb structured body,
   wherein the honeycomb structured body is mainly composed of inorganic fibers and is also composed of an inorganic matter containing silica, the inorganic fibers are fixed with one another by the inorganic matter containing silica, and a vicinity of each intersecting portion between the inorganic fibers is fixed to each other,
   wherein the honeycomb structured body has an aperture ratio that is at least about 30% and at most about 50%.

2. The honeycomb structured body according to claim 1, wherein a thickness of said cell wall is about 0.6 mm or more.

3. The honeycomb structured body according to claim 1, wherein a catalyst is supported on at least a portion of said honeycomb structured body.

4. The honeycomb structured body according to claim 1, wherein the honeycomb structured body has an average pore diameter that is set to a lower limit value of about 1 μm and an upper limit value of about 100 μm.

5. A honeycomb structured body comprising:
   a plurality of cells that are placed in parallel with one another in a longitudinal direction with a cell wall therebetween; and a sealing portion sealing either one of the end portions of the cells, wherein said honeycomb structured body has a plurality of lamination members laminated in the longitudinal direction so that the cells are superposed on one another, said lamination members mainly composed of inorganic fibers and also composed of an inorganic matter containing silica, wherein the honeycomb structured body has a porosity of at least about 70% and at most about 95% and having a length about 0.2 to about 0.9 times a diameter thereof, the length being in the longitudinal direction of the honeycomb structured body, and the diameter being of a cross-section perpendicular to the longitudinal direction of the honeycomb structured body, wherein the inorganic fibers are fixed with one another by the inorganic matter containing silica, and a vicinity of each intersecting portion between the inorganic fibers is fixed to each other, wherein the honeycomb structured body has an aperture ratio that is at least about 30% and at most about 50%.

6. The honeycomb structured body according to claim 5, wherein a thickness of said cell wall is about 0.6 mm or more.

7. The honeycomb structured body according to claim 5, further comprising:
a plate member made of metal that is laminated as a lamination member for the end portion on both ends of the laminated lamination members mainly composed of inorganic fiber.

8. The honeycomb structured body according to claim 5, wherein a catalyst is supported on at least a portion of said honeycomb structured body.

9. The honeycomb structured body according to claim 5, wherein a thickness of said lamination member is at least about 0.1 mm and at most about 20 mm.

10. The honeycomb structured body according to claim 5, wherein said inorganic fiber comprises at least one inorganic material selected from the group consisting of silica-alumina, mullite, alumina, silica, titania, zirconia, silicon nitride, boron nitride, silicon carbide, and basalt.

11. The honeycomb structured body according to claim 5, wherein the fiber length of said inorganic fiber is at least about 0.1 mm and at most about 100 mm.

12. The honeycomb structured body according to claim 5, wherein said honeycomb structured body comprises a laminate of lamination members having different cell dimensions.

13. The honeycomb structured body according to claim 5, wherein the honeycomb structured body has an average pore diameter that is set to a lower limit value of about 1 μm and an upper limit value of about 100 μm.

14. A honeycomb structured body comprising:
a plurality of pillar-shaped porous ceramic members, each having a plurality of cells placed in parallel with one another in a longitudinal direction with a cell wall therebetween, are combined with one another by interposing a sealing material layer; and
a sealing portion sealing either one of the end portions of said cells, wherein the honeycomb structured body has a porosity of at least about 70% and at most about 95% and having a length about 0.2 to about 0.9 times a diameter thereof, the length being in the longitudinal direction of the honeycomb structured body, and the diameter being of a cross-section perpendicular to the longitudinal direction of the honeycomb structured body, wherein an aperture ratio is at least about 30% and at most about 50%, wherein said plurality of pillar-shaped porous ceramic members are mainly composed of inorganic fibers and are also composed of an inorganic matter containing silica, wherein the inorganic fibers are fixed with one another by the inorganic matter containing silica, and a vicinity of each intersecting portion between the inorganic fibers is fixed to each other.

15. The honeycomb structured body according to claim 14, wherein a thickness of said cell wall is about 0.6 mm or more.

16. The honeycomb structured body according to claim 14, wherein a catalyst is supported on at least a portion of said honeycomb structured body.

17. The honeycomb structured body according to claim 14, wherein the honeycomb structured body has an average pore diameter that is set to a lower limit value of about 1 μm and an upper limit value of about 100 μm.

18. A honeycomb structured body comprising:
a porous ceramic body having a plurality of cells placed in parallel with one another in the longitudinal direction with a cell wall therebetween; and
a sealing portion sealing either one of the end portions of the cells, said porous ceramic body being sintered and formed into an integral form as a whole, wherein the honeycomb structured body has a porosity of at least about 70% and at most about 95% and having a length about 0.2 to about 0.9 times a diameter thereof, the length being in the longitudinal direction of the honeycomb structured body, and the diameter being of a cross-section perpendicular to the longitudinal direction of the honeycomb structured body, wherein an aperture ratio is at least about 30% and at most about 50%, wherein said porous ceramic body is mainly composed of inorganic fibers and is also composed of an inorganic matter containing silica, wherein the inorganic fibers are fixed with one another by the inorganic matter containing silica, and a vicinity of each intersecting portion between the inorganic fibers is fixed to each other.

19. The honeycomb structured body according to claim 18, wherein a thickness of said cell wall is about 0.6 mm or more.

20. The honeycomb structured body according to claim 18, wherein a catalyst is supported on at least a portion of said honeycomb structured body.

21. The honeycomb structured body according to claim 18, wherein the honeycomb structured body has an average pore diameter that is set to a lower limit value of about 1 μm and an upper limit value of about 100 μm.

* * * * *

UNITED STATES PATENT AND TRADEMARK OFFICE
CERTIFICATE OF CORRECTION

PATENT NO. : 8,283,019 B2
APPLICATION NO. : 11/563512
DATED : October 9, 2012
INVENTOR(S) : Kazushige Ohno, Kazutake Ogyu and Takafumi Kasuga It is certified that error appears in the above-identified patent and that said Letters Patent is hereby corrected as shown below:

Title page, item (63) should read as follows:

(63) Continuation of application No. PCT/JP2006/306571, filed on Mar. 29, 2006.

Signed and Sealed this
Twenty-third Day of July, 2013

Teresa Stanek Rea
*Acting Director of the United States Patent and Trademark Office*